(12) United States Patent
Savoie et al.

(10) Patent No.: US 8,616,150 B2
(45) Date of Patent: *Dec. 31, 2013

(54) DEVICE FOR BLOCKING WORKPIECES, PARTICULARLY SPECTACLE LENSES, FOR THE PROCESSING AND/OR COATING THEREOF

(75) Inventors: Marc Savoie, Wetzlar (DE); Holger Schäfer, Weilmünster (DE); Steffen Wallendorf, Wetzlar-Dutenhofen (DE); Peter Jost, Hohenahr/Mudersbach (DE); Jochen Wagner, Asslar (DE)

(73) Assignee: Satisloh AG, Baar (CH)

( * ) Notice: Subject to any disclaimer, the term of this patent is extended or adjusted under 35 U.S.C. 154(b) by 168 days.

This patent is subject to a terminal disclaimer.

(21) Appl. No.: 12/991,544

(22) PCT Filed: May 11, 2009

(86) PCT No.: PCT/EP2009/003324
§ 371 (c)(1),
(2), (4) Date: Dec. 7, 2010

(87) PCT Pub. No.: WO2009/135689
PCT Pub. Date: Nov. 12, 2009

(65) Prior Publication Data
US 2011/0067628 A1   Mar. 24, 2011

(30) Foreign Application Priority Data

May 9, 2008 (DE) .......................... 10 2008 023 093

(51) Int. Cl.
*B05C 13/02* (2006.01)
*B24B 49/00* (2012.01)

(52) U.S. Cl.
USPC ........... 118/500; 118/503; 118/641; 118/712; 118/323; 451/460; 451/384; 451/390

(58) Field of Classification Search
USPC ........... 118/500, 641–643, 58, 503, 300, 302, 118/321, 323, 684, 712; 425/143, 161, 162, 425/805; 264/1.1, 1.36, 1.38; 451/5, 384, 451/390, 460, 8; 427/164, 168
See application file for complete search history.

(56) References Cited

U.S. PATENT DOCUMENTS 3,804,153 A * 4/1974 Tagnon .......................... 164/332
4,115,956 A * 9/1978 Huffman .......................... 451/4

(Continued)

FOREIGN PATENT DOCUMENTS

| DE | 39 30 503 A1 | 3/1991 |
|---|---|---|
| DE | 102004021696 A1 * | 11/2005 |
| EP | 2 093 018 A1 | 8/2009 |

OTHER PUBLICATIONS

English Translated doc DE 102004021696A1 Nov. 24, 2005.*

(Continued)

*Primary Examiner* — Yewebdar Tadesse
(74) *Attorney, Agent, or Firm* — Reising Ethington P.C.

(57) ABSTRACT

A device for blocking workpieces for the processing and/or coating thereof, has a support surface for positioning the workpiece to be blocked, a blocking station in which the workpiece can be blocked on a blocking piece by a temporarily deformable blocking material, and a transport device which has a retaining head for the workpiece and by which a relative movement can be created between the workpiece being retained at the retaining head, and the support surface and the blocking station. The transport device has at least four position-controlled movement axes, by which to position the workpiece in a defined manner in consideration of the orientation and geometric information relative to a blocking piece located in the blocking station, and can be retained in the defined relative position to the blocking piece during blocking while leaving a blocking material accommodation gap between the workpiece and the blocking piece.

25 Claims, 36 Drawing Sheets

(56) References Cited

U.S. PATENT DOCUMENTS

| | | | |
|---|---|---|---|
| 5,402,607 A | * | 4/1995 | Lombard .......................... 451/5 |
| 5,763,075 A | | 6/1998 | Benjamin et al. |
| 5,855,430 A | | 1/1999 | Coushaine et al. |
| 5,919,080 A | | 7/1999 | Savoie et al. |
| 6,012,965 A | | 1/2000 | Savoie |
| 2005/0139309 A1 | * | 6/2005 | Savoie et al. ................... 156/99 |
| 2005/0173046 A1 | | 8/2005 | Savoie et al. |
| 2010/0170635 A1 | | 7/2010 | Savoie |

OTHER PUBLICATIONS

EPO International Search Report and Written Opinion, International Application No. PCT/EP2009/003324, International Filing Date Nov. 5, 2009, Mailing Date Sep. 21, 2009, 12 pages.

* cited by examiner

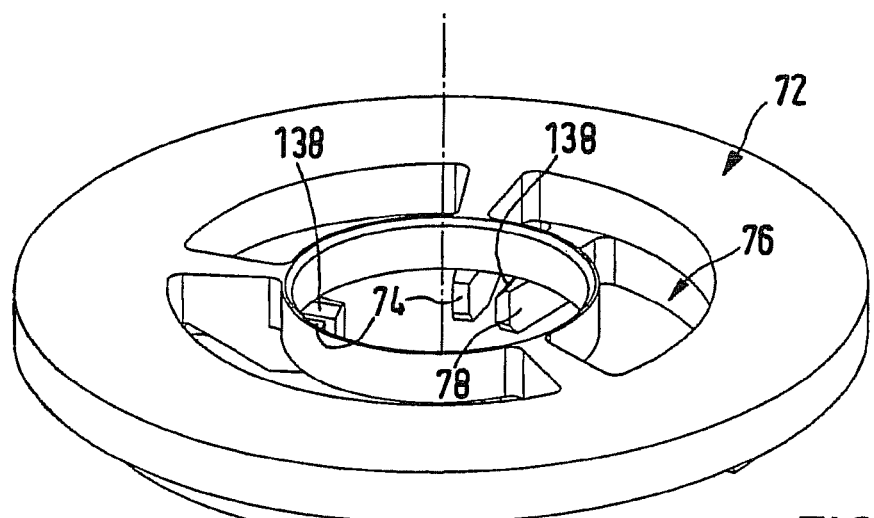
FIG.14A
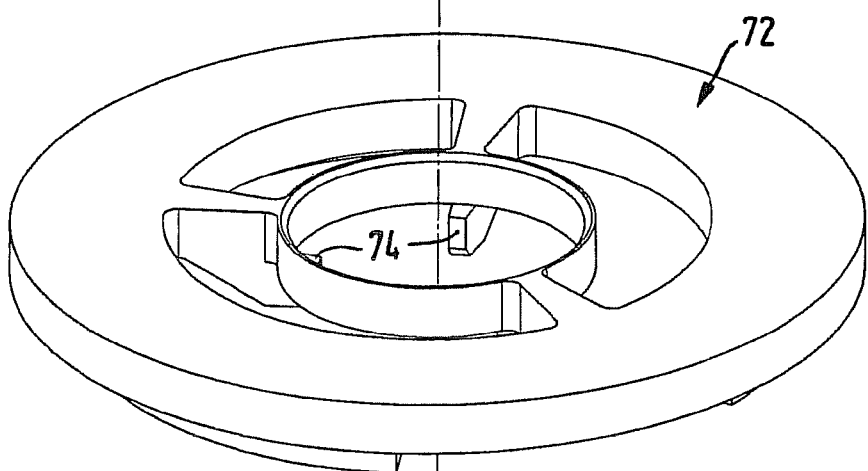
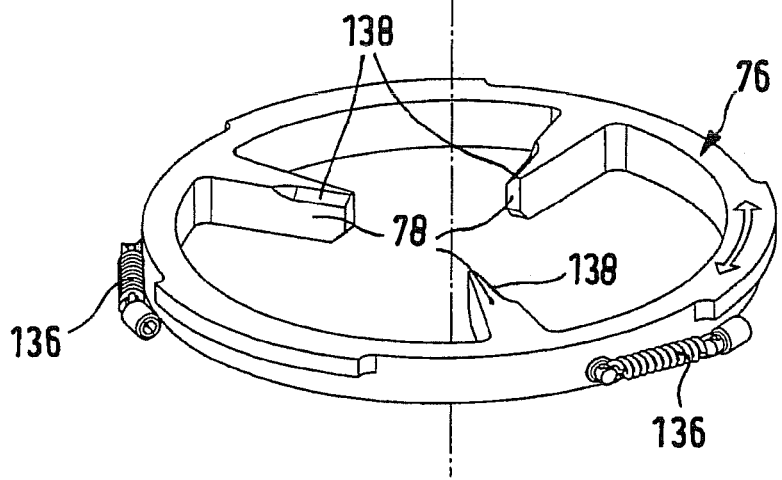
FIG.14B

DEVICE FOR BLOCKING WORKPIECES, PARTICULARLY SPECTACLE LENSES, FOR THE PROCESSING AND/OR COATING THEREOF

TECHNICAL FIELD

The present invention relates in general to a device for blocking workpieces for the processing thereof and/or coating thereof, wherein the resulting so-termed "block" serves the purpose of holding the workpiece in the relevant processing machine and/or coating installation.

The invention particularly relates to a device for blocking spectacle lenses, which are to be blocked on a large scale in so-termed "RX workshops" before the blocked spectacle lens concerned is subjected to material-removing processing at its back or front surface with respect to its optical effect and/or at the edge for fitting into an associated spectacle frame by a geometrically defined (milling/turning) or geometrically undefined (grinding/polishing) cutter and/or coated on its back or front surface for attainment of additional effects (for example, increase in scratch resistance, anti-reflection characteristics, reflective coating, hydrophobic characteristics).

If, in the following, there is mention in connection with the present invention in general of "spectacle lenses" as the preferred field of use there is to be understood by that expression optical lenses or lens blanks for spectacles of usual materials, such as polycarbonate, mineral glass, CR 39, HI index, etc., and with any desired shape of the circumferential edge of the lens or of the lens blank, which before the blocking can—but does not have to be—already processed and/or coated at either or each optically effective surface and/or at the edge. In addition, the spectacle lens can be provided on its surface, at which it is blocked, with a film, lacquer or the like so as to protect the surface against contamination and damage and/or to improve the adhesion properties between spectacle lens and blocking material, without being specifically mentioned on each occasion in the following.

PRIOR ART BACKGROUND OF THE INVENTION

Documents U.S. Pat. No. 5,919,080, U.S. Pat. No. 6,012,965 and US 2005/0173046 A1, describe a spectacle lens blocker designed for attaching a spectacle lens to a block piece without in that case contacting the spectacle lens, the block piece or a blocking ring. These blocking devices use a manual spectacle lens imaging and aligning station, in conjunction with two axes for automatic movement control for a spectacle lens receiving head in order to position the spectacle lens at a predetermined height and position above the block piece. In the simplest form of these devices the operator (after input of job data or downloading of the same from a host computer) thus begins to position a spectacle lens blank on the imaging station. The imaging station projects a plan view of the spectacle lens blank on a computer screen, while the computer at the same time inserts an image of the desired position and axial orientation of the spectacle lens blank on the same screen so as to superimpose these images.

The operator aligns the "true" image of the spectacle lens blank on the ideal image generated by the computer. The desired position is determined by the computer on the basis of the various job data which were calculated in correspondence with the prescription data desired by the end customer. The operator can move the spectacle lens blank forwardly or backwardly and position it in any desired angular position on the imaging station. When the operator has correctly aligned the spectacle lens blank, the operator confirms this by pressing a button.

The system computer then moves the spectacle lens receiving head with respect to the two aforesaid movement axes. The receiving head receives the spectacle lens in the position which the imaging station has predetermined and moves it to the blocking station. The block piece, which was inserted into the blocking station, is then held in the blocking station in a fixed and known position relative to the machine co-ordinate system. A blocking material can then flow in liquid state into the blocking station and the spectacle lens is placed by way of the aforesaid movement axis in the liquid blocking material. In that case, the spectacle lens contacts neither the block piece nor the casting mould, but is held only by the receiving head and can cure. The receiving head can then release the spectacle lens and the spectacle lens mounted, i.e. blocked on the block piece can be removed from the blocking station.

In the above-described prior art only four degrees of freedom can be taken into consideration in the blocker in order to position the spectacle lens on the block piece. Two of these degrees of freedom are determined by the operator by manual setting at the imaging station, while the other two degrees of freedom are provided by the two movement axes. However, six degrees of freedom (three translational and three rotational) are required in order to fully position an object in a desired three-dimensional co-ordinate system. Accordingly, absent from the outlined prior art are two degrees of freedom for fully positioning the spectacle lens with respect to the block piece, as can be expected in a conventional blocking method with a blocking ring for supporting the spectacle lens.

Compensation for these "errors" is provided in the above prior art in that these, if not known, are initially determined and then correction data are transmitted to the downstream processing machines. The movement control system of these downstream processing machines then has to have the degrees of freedom lacking in the blocker so that compensation can be provided for the above "errors" identified by the blocker. The processing machine thus has to "adapt" to the blocker or be "adapted" to this, which restricts the use of this blocker.

What is needed is a device for blocking workpieces, particularly spectacle lenses, for processing and/or coating thereof, which can be used as universally as possible without requiring specific processing machines or specific processing default settings in the downstream process.

SUMMARY OF THE INVENTION

According to one aspect of the invention, in a device for blocking workpieces, particularly spectacle lenses, for processing and/or coating thereof, which comprises a support for supporting the workpiece to be blocked, a blocking station in which the workpiece can be blocked on a block piece with a temporarily deformable blocking material, and a transport device, which has a holding head for the workpiece that provides relative movement between the workpiece held at the holding head on the one hand and the support as well as the blocking station on the other hand. The transport device has at least four closed-loop position controlled movement axes to position the workpiece with consideration of orientation and geometry data of the workpiece in a defined manner relative to a block piece disposed in the blocking station. The workpiece can be held during the blocking in the defined relative position with respect to the block piece while leaving a blocking material receiving gap between workpiece and block piece.

Thus, according to the invention at least two and at most four additional closed-loop position controlled movement axes for the actual blocking process are provided so as to increase the total available degrees of freedom of the blocking device to six. In the case of correct configuration of the blocking device it is then possible to obtain general blocking instructions from, for example, a laboratory software system (host) and to block the spectacle lens precisely in accordance with those instructions. Further calculations or compensations in the downstream process are then no longer necessary. The downstream processing machine can therefore handle a spectacle lens, which was blocked in the blocking device according to one aspect of the invention.

Since, in addition, during the blocking the spectacle lens can be held in the defined relative position with respect to the block piece while leaving the blocking material receiving gap between spectacle lens and block piece ("spatial blocking"), the accuracy during blocking of certain problematic spectacle lens can be increased. This applies to, for example, varifocal lenses (PALs), in which it can be very difficult to correctly set these if they are placed on conventional circular "blocking rings", because the varifocal curve is not spherical and the spectacle lens are thus seated incompletely or in a wobbly manner on the blocking ring. Finally, undesired prismatic errors at the blocked spectacle lens can also be reliably avoided with the blocking device according to the invention.

Further advantages and characteristics of the blocking device according to the invention will be evident to the expert from the following description of preferred embodiments.

BRIEF DESCRIPTION OF THE DRAWINGS

The invention is explained in more detail in the following by way of preferred embodiments with reference to the accompanying partly schematic drawings, in which the same reference numerals denote the same or corresponding parts and in which:

FIG. 14A shows a perspective illustration of the clamping device of the blocking station according to FIGS. 11 to 13;

FIG. 14B shows an exploded illustration of the clamping device of FIG. 14A;

In the figures, which show the same parts also in different scales, parts of the blocking device not essential for understanding the present invention, for example, claddings, control unit with screen and input possibilities were omitted for simplification of the illustration.

DETAILED DESCRIPTION OF THE EMBODIMENTS

Figure 1:
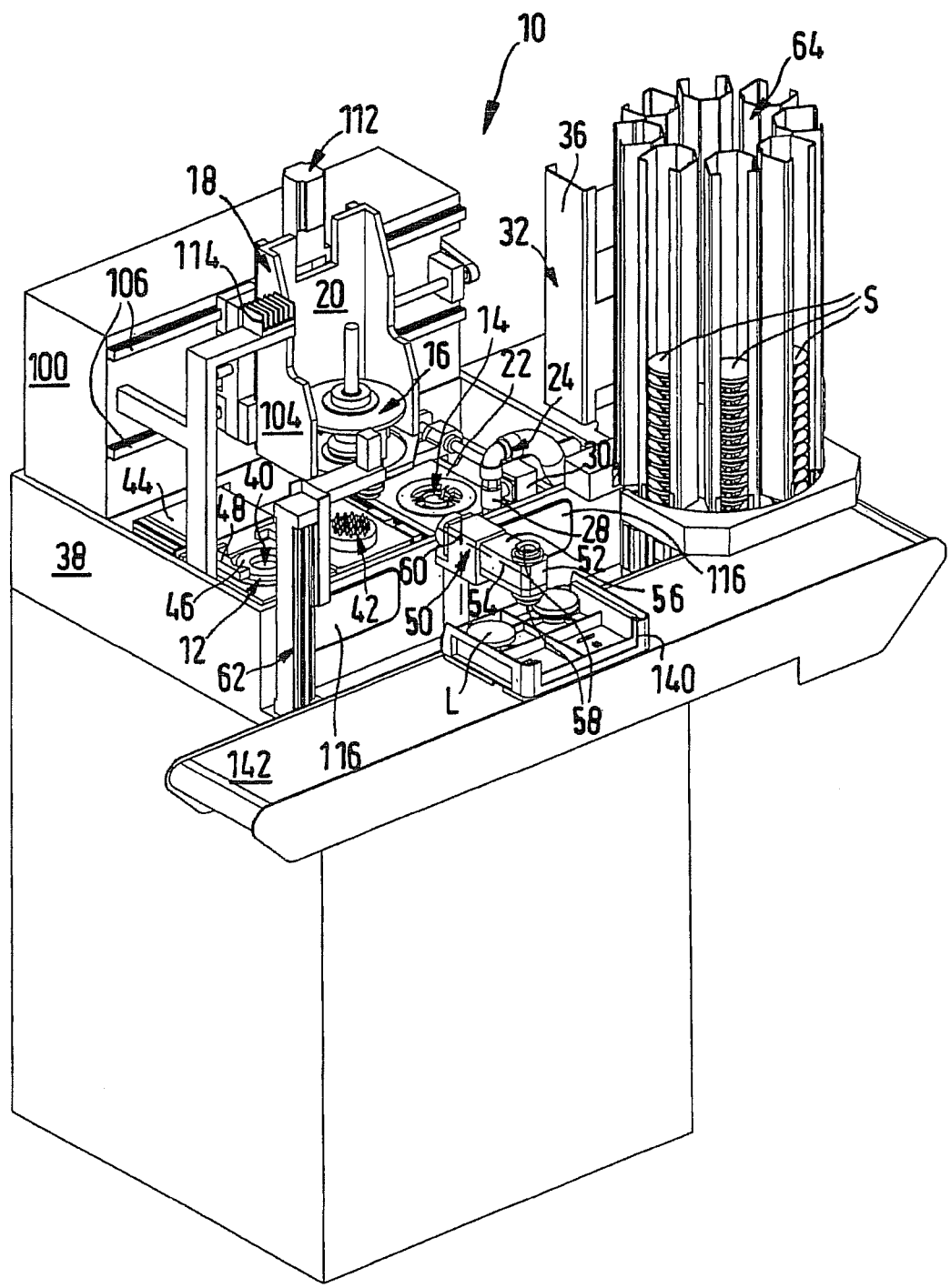
FIG. 1 shows a perspective view of the blocking device, from left above.
Figure 2:
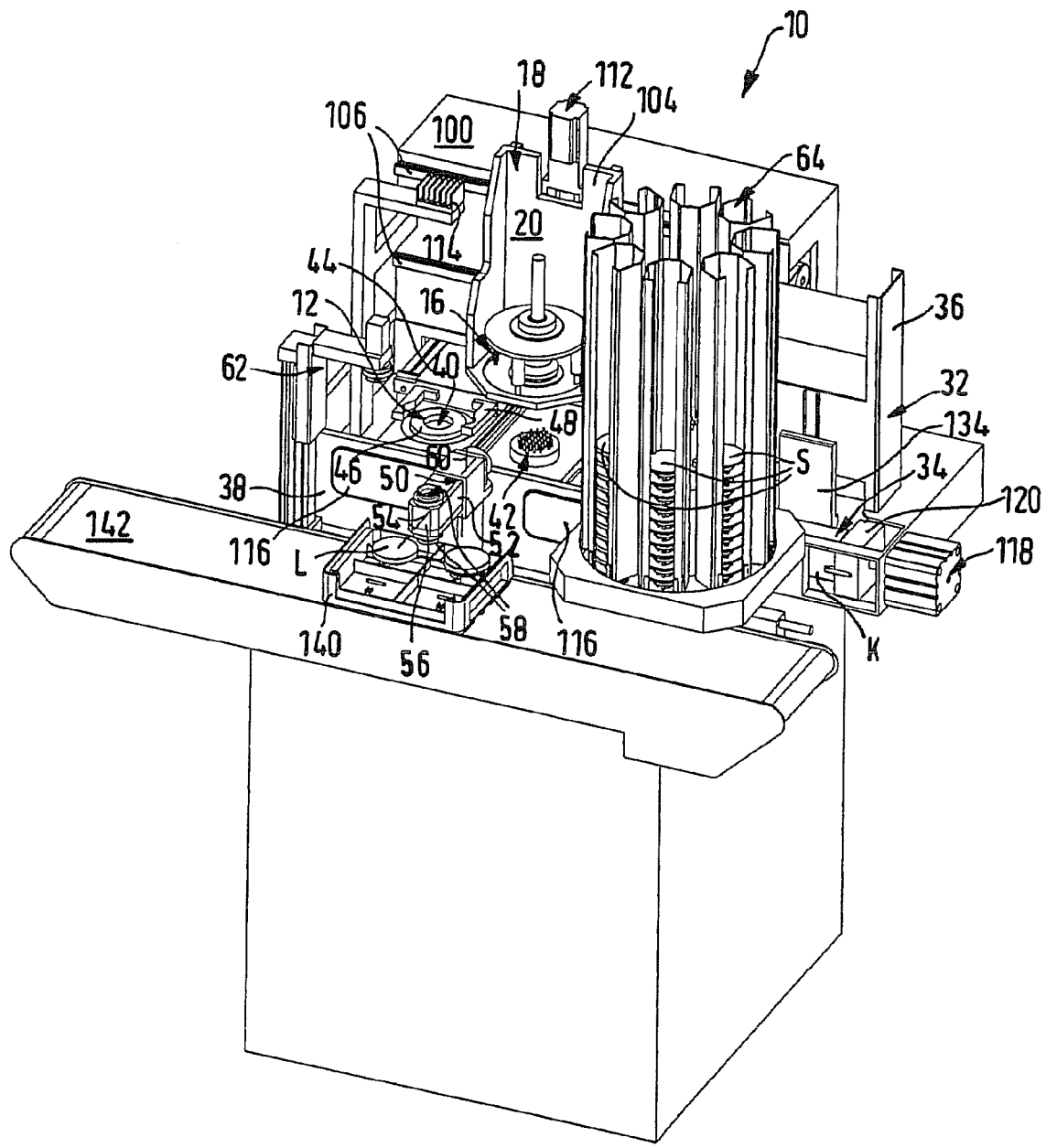
FIG. 2 shows a perspective view of the blocking device, from right above.
Figure 3:
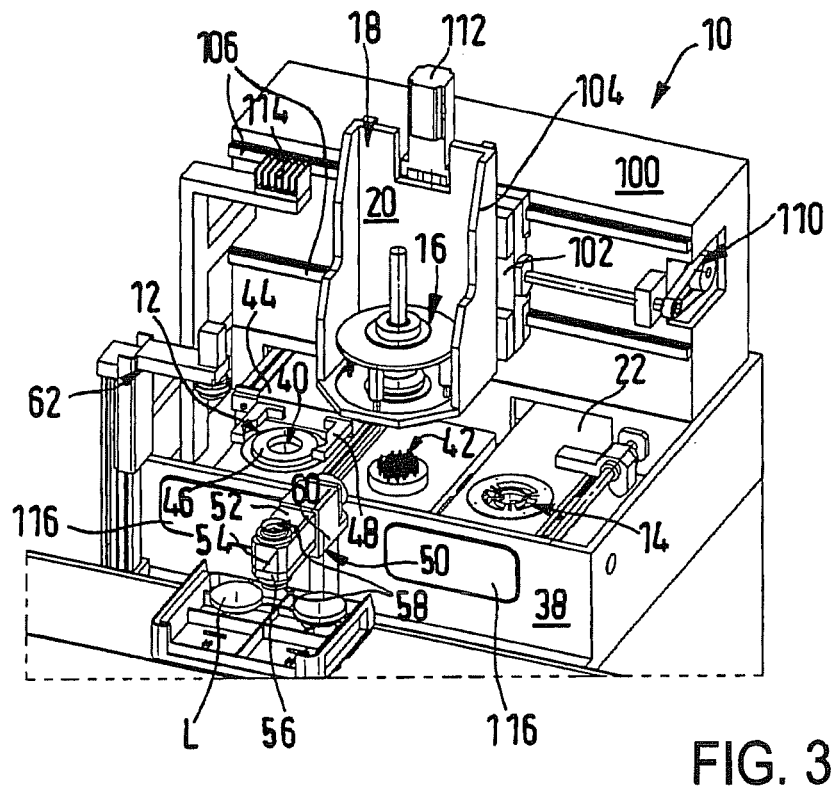
FIG. 3 shows a perspective detail view of the blocking device, from right above, wherein for simplification of the illustration the metering device, the feed device, the magazine for the blocking material cartridges and the block piece magazine have been omitted.

According to, in particular, FIGS. 1 to 4 a device 10 for blocking spectacle lenses L for processing and/or coating thereof comprises a measuring station 12 for detection of the orientation and of geometry data of the spectacle lens L to be blocked, a blocking station 14 in which the spectacle lens L can be blocked on a block piece S with a temporarily deformable blocking material M, and a transport device 18, which comprises a holding head 16 for the spectacle lens L. A relative movement between the spectacle lens L held at the holding head 16 on the one hand and the measuring station 12 as well as the blocking station 14 on the other hand can be produced.

The temporarily deformable blocking material M is preferably a blocking material which can be cured by light and which is explained in detail in EP 2 011 604 A1 of the present applicant, to which express incorporation by reference is hereby made with respect to the constitution and characteristics of the blocking material M. Conversely, the block piece S employed is explained in detail in the earlier European Patent Application 08 003 335.0 of the present applicant, to which express incorporation by reference is similarly hereby made with respect to structure and function of the block piece S; to the extent that this block piece S has, in addition, been slightly modified, this will be explained in the following with reference to FIG. 39.

Figure 19:
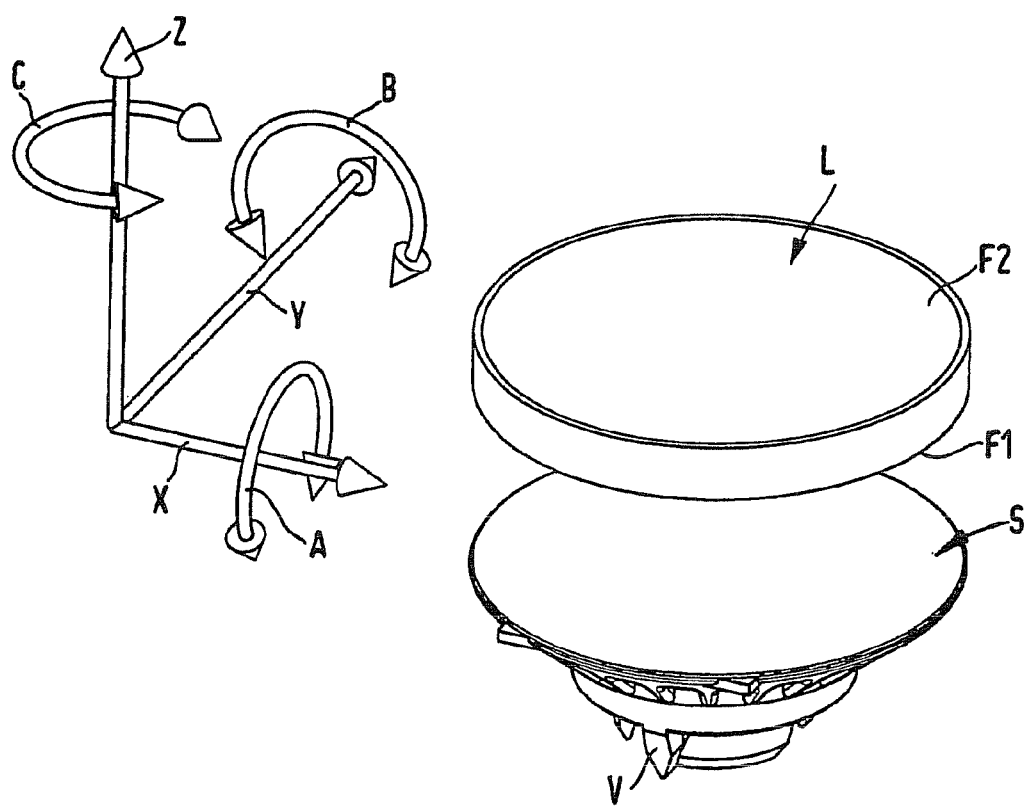
FIG. 19 shows a perspective exploded illustration of a spectacle lens and a block piece, which illustrates the movement degrees of freedom of the spectacle lens with respect to the block piece.

It is significant that the transport device 18 of the blocking device 10 has at least four, in the illustrated embodiment six, closed-loop position controlled (CNC) movement axes X, Y, Z, A, B, C (see FIGS. 5, 6 and 10), namely three substantially mutually perpendicular linear axes X, Y, Z, which are closed-loop controlled in position, and three rotational, sometimes referred to as tilt, axes A, B, C, which are closed-loop controlled in rotational angle, about the linear axes X, Y, Z, by which the spectacle lens L is positionable in defined manner relative to a block piece S, which is disposed in the blocking station 14, with consideration of the orientation and geometry data—optionally detected in the measuring station 12 or otherwise known—of the spectacle lens L and can be held, during blocking, in the defined relative position with respect to the block piece S while leaving a blocking material receiving gap G (FIG. 20) between spectacle lens L and block piece S. In this connection, FIG. 19 illustrates the relative movements, which are possible with the help of the blocking device 10, between the spectacle lens L and the block piece S before the blocking.

The holding head 16 for the spectacle lens L is in that case constructed to be rotatable and tiltable (tilt axes A, B, rotational axis C), with closed-loop control in rotational angle, in three dimensions. It is possible through the rotational axis C to align the spectacle lens L—optionally after detection in the measuring station 12 and recognition of the position of the spectacle lens L—in accordance with its angular position with respect to the prescription toroidal axis. With regard to constructional details of the holding head 16 with respect to the adjustment possibilities thereof incorporation by reference is at the outset expressly made at this point to the specification DE 39 30 503 A1.

Figure 5:
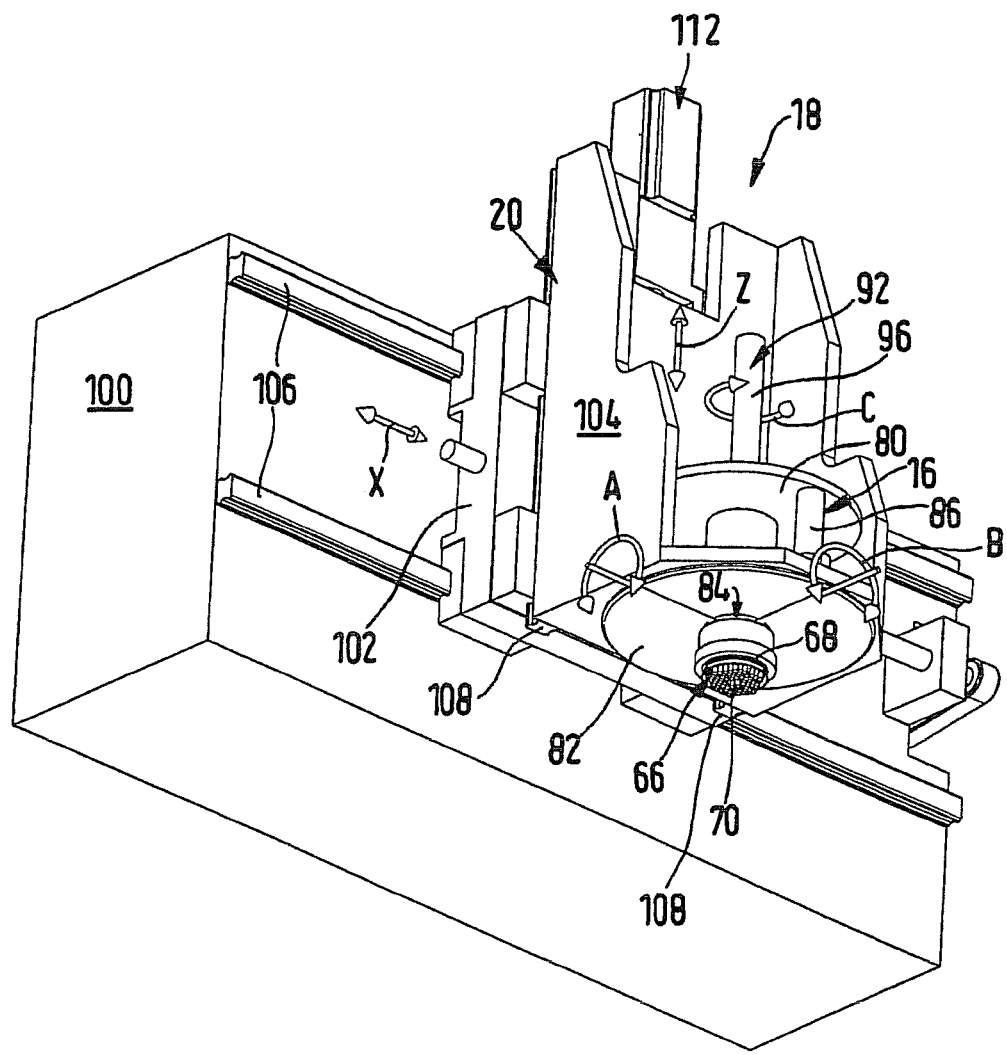
FIG. 5 shows a perspective view of essential parts of the transport device, which is illustrated by itself, from left below, namely the holding head, the cross-table arrangement and the lens clamping unit, for clarification of five closed-loop position controlled movement axes of the transport device.
Figure 6:
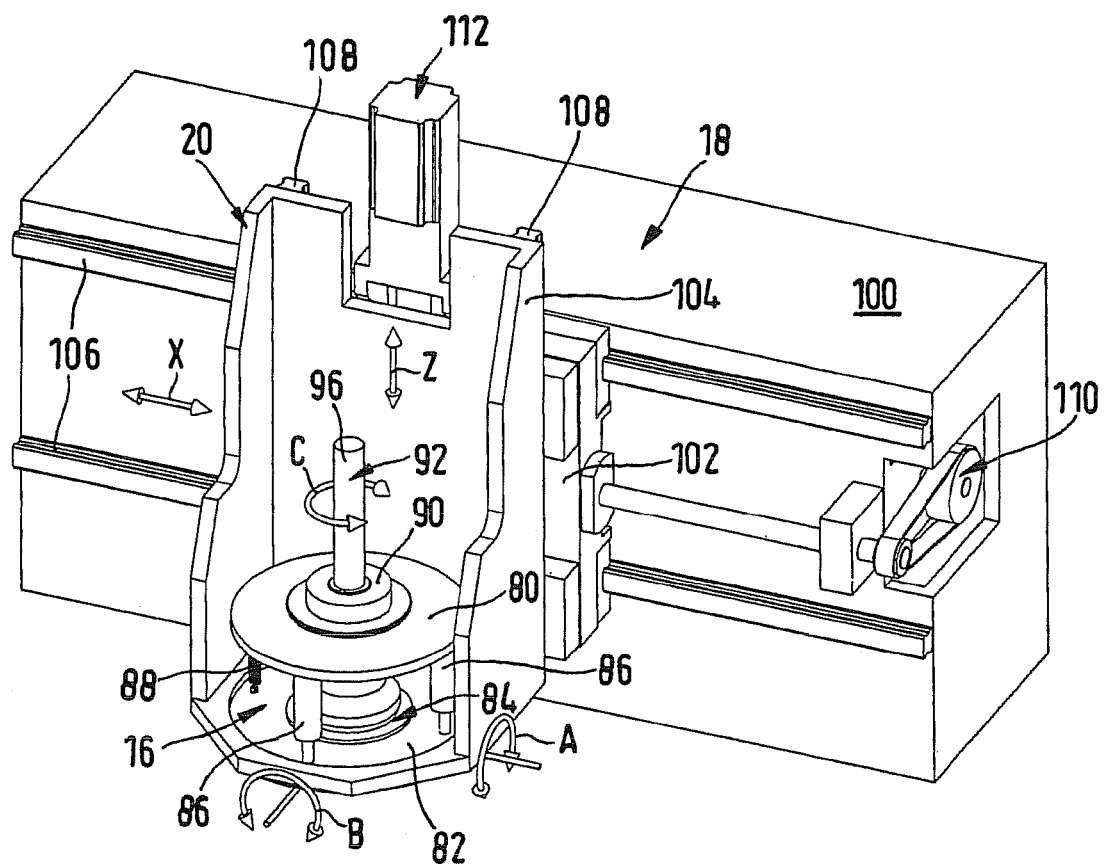
FIG. 6 shows a perspective view, which is similar to FIG. 5, of essential parts of the transport device illustrated by itself, from right above.

According to, in particular, FIGS. 5 and 6 the holding head 16 has an upper plate 80 which is tiltable, with closed-loop control in rotational angle, relative to a lower plate 82 of the holding head 16 and, in particular, about the tilt axes A and B. For this purpose a universal ball joint 84 is provided in the center of the lower plate 82. Two drives 86 arranged at 90° between the plates 80, 82 serve for tilting (tilt axes A and B) the upper plate 80 against the force of tension springs 88, which are tensioned between the plates 80, 82 and of which one tension spring 88 is illustrated by way of example in FIG. 6. A further drive 90 is provided on the upper plate 80 and serves for rotating, with closed-loop control in rotational angle, a hollow shaft 92 (rotational axis C).

Figure 7:
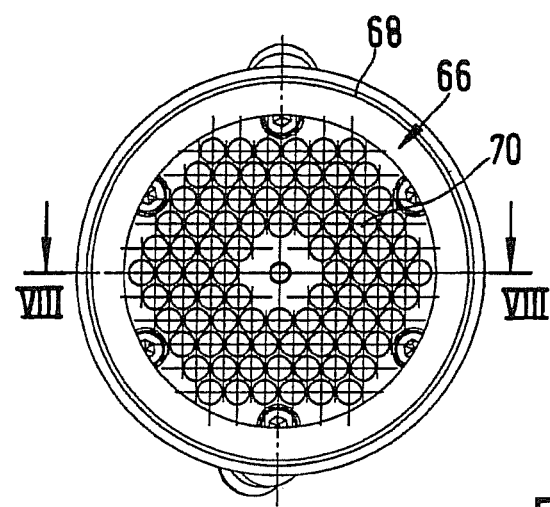
FIG. 7 shows an underneath view of the lens clamping unit illustrated by itself.
Figure 8:
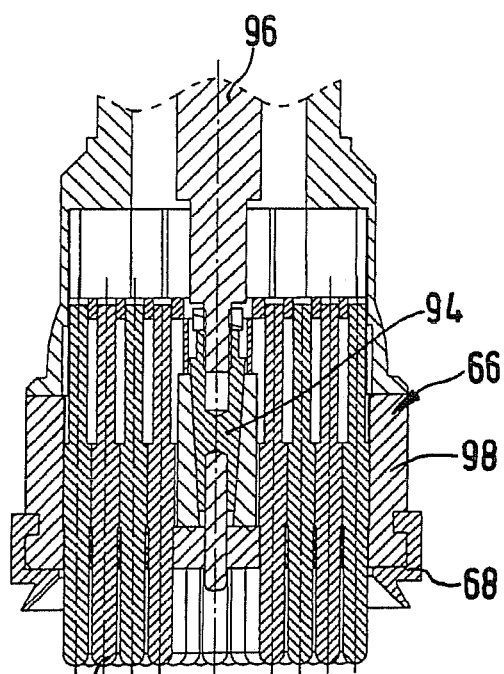
FIG. 8 shows a sectional view in correspondence with the section line VIII-VIII in FIG. 7.
Figure 9:
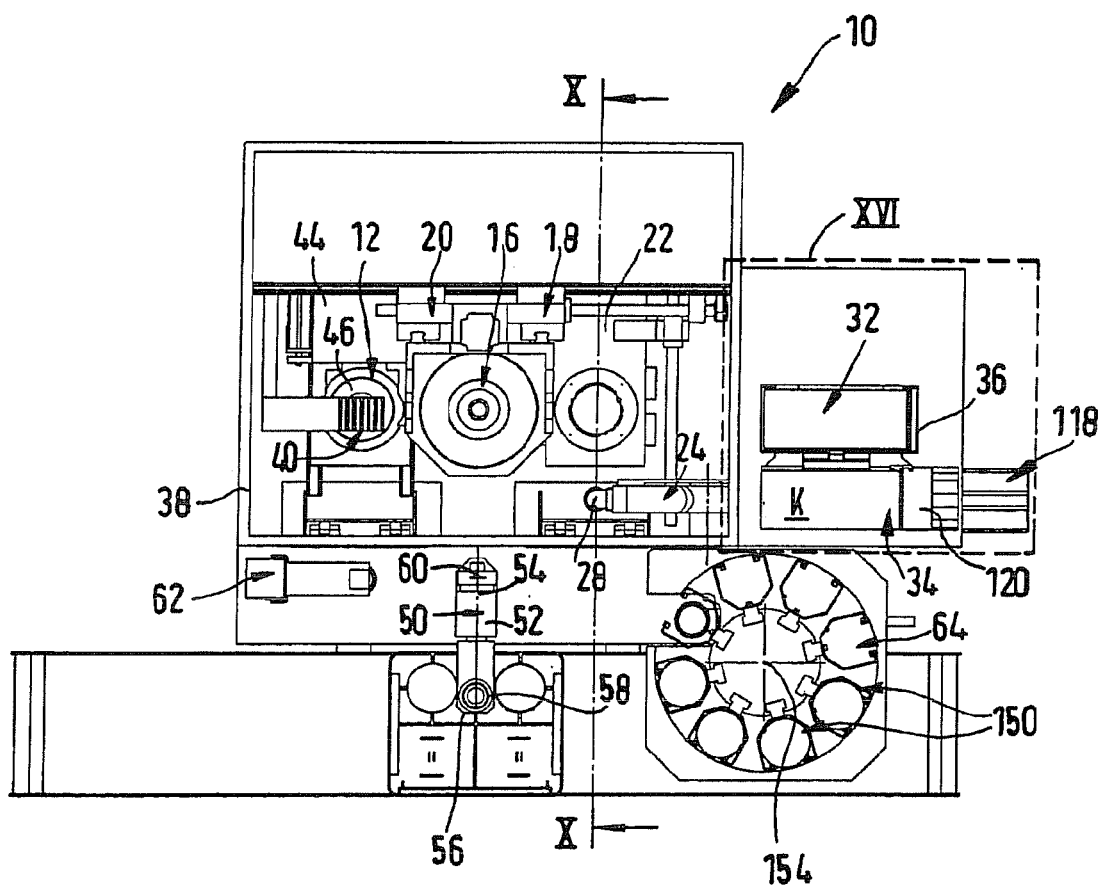
FIG. 9 shows a plan view of the blocking device according to FIGS. 1 and 2.

A lens clamping unit 66, which is shown in more detail in FIGS. 7 and 8 and which has a sucker lip 68 for sucking on the spectacle lens L, is fastened in the hollow shaft 92, the sucker lip surrounding a pin relief 70 which is adaptable to a contact surface F2 of the spectacle lens L and selectably clampable in order to support the spectacle lens L at the contact surface F2 thereof over as much as possible of the full area. In this manner it is possible to tilt the clamped spectacle lens L in two axes (A, B) and rotate it in a further axis (C).

A centrally mounted, conical expansion mandrel 94, which is axially displaceable by way of a pneumatic stroke cylinder 96, is provided for clamping the pin relief 70. The stroke cylinder 96, when acted on by pressure, produces an axial movement of the conical expansion mandrel 94, which in turn exerts on the pins of the pin relief 70 a radial force directed from the inside in outward direction. Since all pins are guided in a sleeve 98 to be tightly packed, this clamping force is transmitted from pin to pin. The pins thereby jam in the sleeve 98 and are axially immovable. The pins are in that case displaced downwardly merely by their own weight and in unclamped state can bear against the contact surface F2 of the spectacle lens L. It is thereby possible for the pins to adapt to any topography of spectacle lens surfaces and to support these in that the entire holding head 16 is moved axially towards the spectacle lens L until a sub-atmospheric pressure switch (not illustrated) ascertains that the sucker lip 68 bears against the contact surface F2 of the spectacle lens L. In this position the axial advance (linear axis Z) for the holding head 16 is switched off and the stroke cylinder 96 is acted on by pressure. After clamping of the pin relief 70 the spectacle lens L attached by suction is fixed in stationary position relative to the lens clamping unit 66, wherein even higher axial or radial forces can be exerted on the spectacle lens L without the position thereof in three-dimensions changing relative to the lens clamping unit 66. By virtue of this special design of the holding head 16, spectacle lenses L with any desired geometry can be attached by suction and transported, with maintenance of their position, by the transport device 18, wherein even higher forces which, for example, act on the spectacle lens L during the blocking process can be transmitted.

As can also be inferred from FIGS. 1 to 6, the holding head 16 for the spectacle lens L is movable, with closed-loop control in position, by way of a cross-table arrangement 20 of the transport device 18 in direction towards a block piece S disposed in the blocking station 14 and away therefrom (Z axis) as well as transversely thereto (X axis). The cross-table arrangement 20 has a base 100, a horizontal slide 102 and a vertical slide 104, which are arranged one in front of the other. The horizontal slide 102 is guided on the base 100 by way of a pair of horizontally extending guide rails 106 and associated carriages, while the vertical slide 104 is guided on the horizontal slide 102 by way of a pair of vertically extending guide rails 108 and associated carriages. Associated with each of the slides 102, 104 is a drive 110, 112, for example a stepping motor with a ball screw, by way of which the respective slide 102, 104 is linearly displaceable in closed-loop position controlled manner (linear axes X and Z). The sensor system (rotation transmitter, length measuring system, etc.) required for that purpose is, like the rotational or tilt axes A, B, C in the holding head 16, not shown in the figures.

As shown in, in particular, FIGS. 1, 3, 4 and 10, the blocking station 14 is arranged on a first slide 22 of the transport device 18, which is movable with closed-loop control in position transversely (Y axis) to the holding head 16 for the spectacle lens L. The sixth axis, i.e. the closed-loop position controlled linear axis Y, of the transport device 18 is thereby realized. Obviously a drive, guides and associated sensor system are equally provided for the first slide 22, which are not, however, illustrated in the figures. During blocking, the spectacle lens L can optionally be decentrally blocked with this axis (and/or the linear axis X).

According to, in particular, FIGS. 1 to 4 the measuring station 12—provided in the illustrated embodiment, but redundant in the case of other forms of acquisition of the appropriate data (for example by input at or data transmission to the blocking device 10)—comprises an optical measuring device 40 for position recognition of the spectacle lens L and a mechanical measuring device 42, which is spaced therefrom, for whole-area measuring of the workpiece surface F1 to be blocked, wherein the spectacle lens L to be blocked is transportable by the holding head 16 of the transport device 18 from the optical measuring device 40 to the mechanical measuring device 42.

The optical measuring device 40 and also the mechanical measuring device 42 largely correspond in terms of function with the measuring devices described in the specification US 2005/0173046 A1, which is hereby incorporated by referenced so that they do not need to be described in more detail at this point. In the case of the optical measuring device 40 the camera (not shown), by which a shadowgraph of the spectacle lens L (contour, reading field and markings) is recognizable, but without use of a minor box, is provided in the lower part of the measuring device 40. The transillumination of the spectacle lens L consequently takes place from above by an LED lamp 114. Use can also be made here of an infrared LED which offers the advantage, particularly in a case of strongly tinted spectacle lenses L, of a precise and high-contrast representation of the respective spectacle lens L.

Moreover, the transport device 18 has, according to, in particular, FIGS. 1 to 4 and 9, a second slide 44 which carries a transparent (annular) support 46 with a (parallel) gripper 48 for centering gripping of the spectacle lens L, wherein the support 46 together with the gripper 48 is, for simplification of the loading process and for better protection of the measuring device 40, movable by the second slide 44 from the optical measuring device 40 in drawer-like manner horizontally out of a housing 38 of the blocking device 10 to a transfer position (FIG. 4) in which a spectacle lens L can be placed by its workpiece surface F1, which is to be blocked, on the support 46, and conversely back to the optical measuring device 40. By contrast to the first slide 22 of the transport device 18, the second slide 44 of the transport device 18 is movable by a pneumatic cylinder against adjustable end abutments.

Equally, the blocking station 14 can, particularly for simplification of the loading process, be moved by the first slide 22 of the transport device 18 in drawer-like manner horizontally out of the housing 38 of the blocking device 10 to a transfer position (FIG. 4) in which a block piece S is insertable into the blocking station 14 or a spectacle lens L blocked on a block piece S is removable from the blocking station 14. Flaps 116 (FIGS. 1 to 4 and 10) closing automatically (for example spring-biased) at both slides 22, 44 protect the blocking device 10 and the operator.

In an embodiment which is an alternative thereto (not illustrated) a large upwardly pivotable protective hood of a suitable transparent synthetic material (for example Makrolon (Registered Trade Mark) of the company Bayer), which covers the entire upper part of the blocking device and enables better access to the interior of the blocking device, can also be provided instead of the flaps, which make possible drawer-like movement of the slides out of the housing, and the associated housing wall. This protective hood can advantageously have on its inner side a coating which absorbs ultraviolet and infrared light so that this radiation does not place the operator at risk, the latter nevertheless having—even in operation of the blocking device—a clear view of the essential parts or subassemblies of the blocking device.

Figure 10:
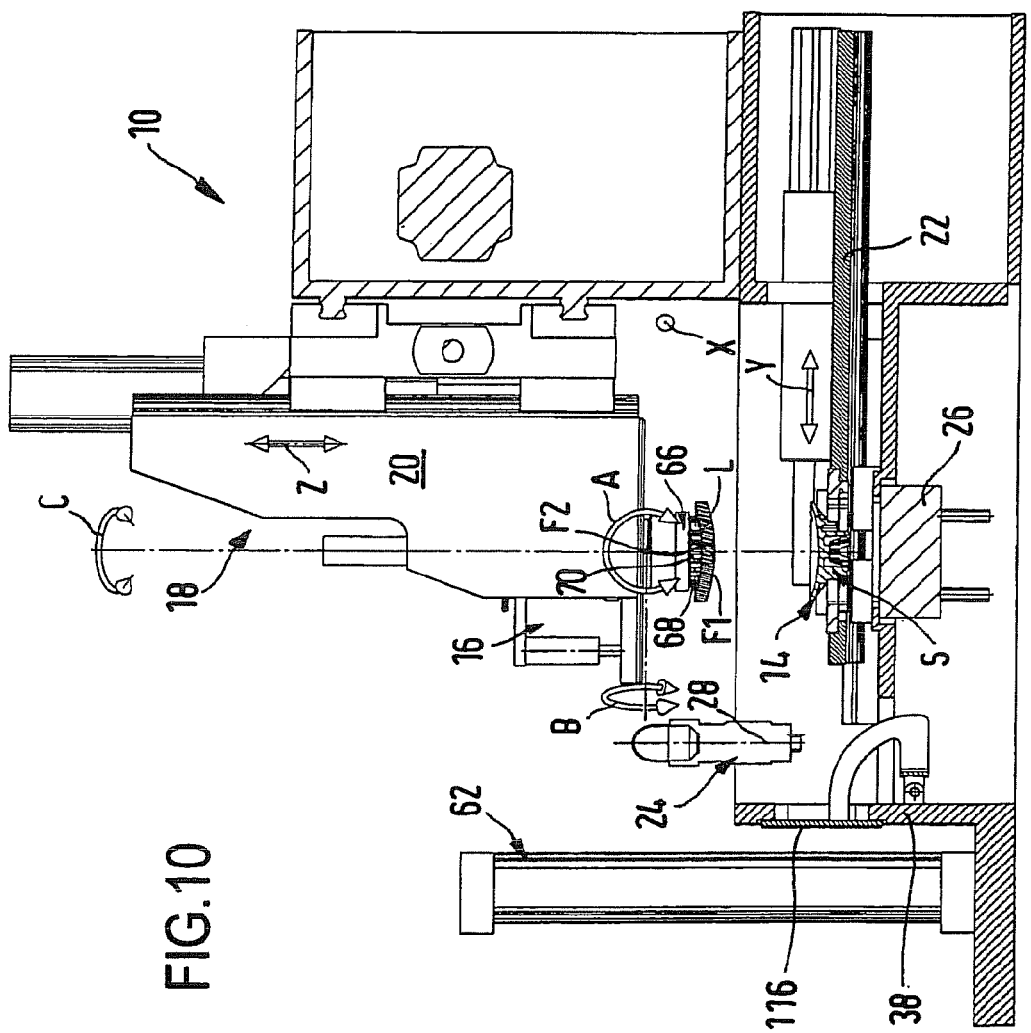
FIG. 10 shows a sectional view in correspondence with the section line X-X in FIG. 9, wherein for simplification of the illustration the loading unit has been omitted.
Figure 11:
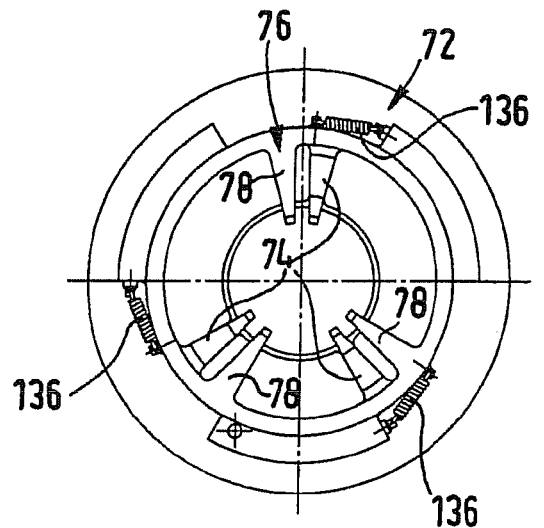
FIG. 11 shows an underneath view of parts of the blocking station illustrated by themselves, namely the clamping device thereof.
Figure 12:
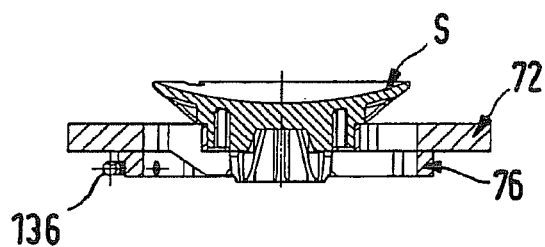
FIG. 12 shows a sectional view of the clamping device, which is shown in FIG. 11, of the blocking station in correspondence with the section line XII-XII in FIG. 13.
Figure 13:
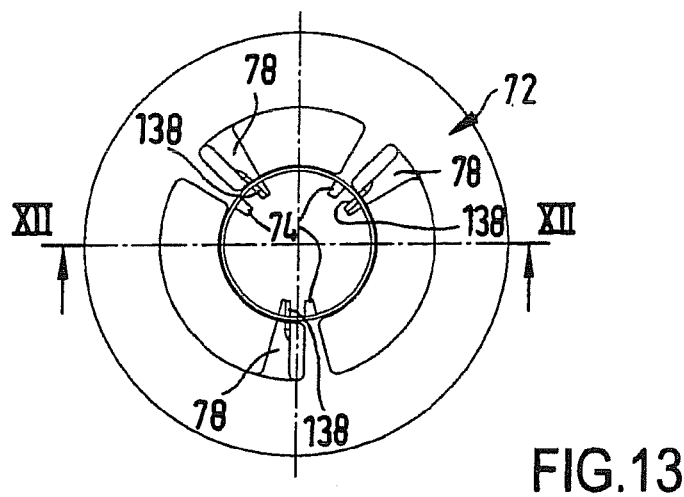
FIG. 13 shows a plan view of the clamping device of FIG. 11.

Also provided according to, in particular, FIG. 10 are a metering device 24, which applies the blocking material curable by light to a block piece S disposed in the blocking station, and an exposure device 26, which is horizontally spaced from the metering device 24 and exposes light to the blocking material M for curing, wherein the blocking station, 14 is movable by the first slide 22 of the transport device 18 from the metering device 24, in which the blocking material M can be centrally or decentrally applied to the block piece S, to the exposure device 26 and vice versa.

Since the metering device 24 and the exposure device 26 are separated from one another in terms of location, there is no risk of contaminations due to excess or still dripping blocking material M impairing the exposure of ultraviolet light. Thus, an otherwise—optionally non-uniform—polymerization and thereby resulting stresses of the blocked spectacle lens are avoided, which could in turn lead to substantial inaccuracies of the processed surface after the deblocking.

After the spectacle lens L has been pressed by the holding head 16 of the transport device 18 with defined positioning in three dimensions onto the block piece S, which is disposed in the blocking station 14 above the exposure device 26 and provided with the blocking material M, while leaving the blocking material receiving gap G, exposure is carried out in the exposure device 26 from below through the transparent block piece S by an ultraviolet lamp (not shown), wherein optionally several exposure processes are undertaken.

Figure 4:
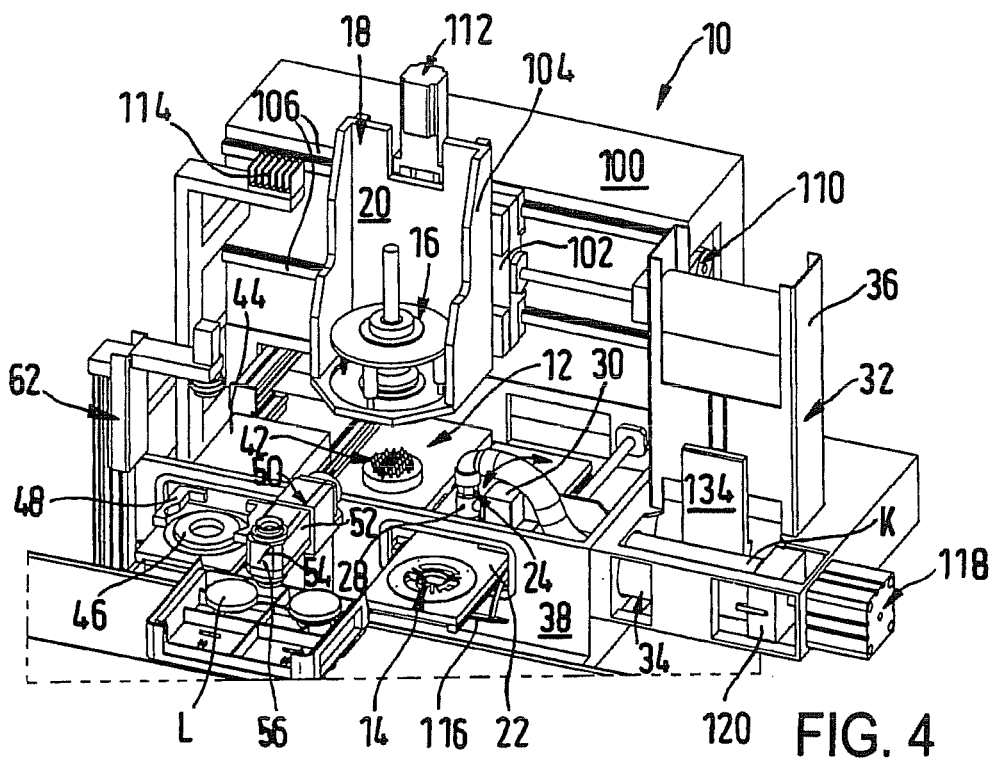
FIG. 4 shows a perspective detail view of the blocking device, from right above, wherein first and second slides of the transport device are disposed in a transfer position, which is moved out of the housing of the blocking device, for the workpiece or the block piece.

As can be seen particularly in FIGS. 1, 4 and 10, the metering device 24 has a metering head 28 which is movable, namely pivotable, in direction towards a block piece S disposed in the blocking station 14 and away therefrom, so that the blocking material M is feedable in a position of the metering head 28 near the block piece S and the feed of the blocking material M can be terminated with movement of the metering head 28 away from the position near the block piece S to a position remote from the block piece S. The metering device 24 is connected by way of a valve, in particular a pneumatically actuated ball valve, with a feed device 32 for the blocking material M. A pre-calculated quantity of blocking material M is applied by the metering device 24 to the block piece S, wherein the front curve of the spectacle lens L and a possible tipping of the spectacle lens L by way of the holding head 16 can be taken into consideration in the volume calculation.

The feed device 32 for the blocking material M comprises, according to FIGS. 2, 4, 16 and 17, a receiving space 34 for an exchangeable blocking material cartridge K, from which the blocking material M is displaceable by compressed air action of a cartridge piston P. The compressed air bears by a predetermined pressure constantly against the piston P of the blocking material cartridge K. The quantity of blocking material M can thus be metered by setting the pressure and setting the opening time (at the valve 30). After metering of the blocking material M the metering head 28 is rapidly distanced from the block piece S by pivotation, whereby tearing-off of the blocking material M at the nozzle of the metering head 28 is produced without the blocking material M continuing to drip.

According to FIGS. 1, 2, 4, 9, 16 and 17 the feed device 32 for the blocking material M has a magazine 36 for reception of a plurality of blocking material cartridges K, from which on each occasion a blocking material cartridge K can be automatically charged into the receiving space 34 of the feed device 32 for replacement of an empty blocking material cartridge K. A quantity of blocking material M sufficient for a day's production can thus be stored and fed with precise metering. According to FIG. 16, the feed device 32 has a closing cylinder 118 for cartridge clamping by an axially displaceable clamping section 120. The blocking material cartridge K sealed off at the rear side (sealing element 122 in FIG. 16) can be pressed by its front side (at the left in FIG. 16) against a connecting stub pipe 124, wherein a frontal cartridge closure (for example a film or the like) can also be punctured or cut through in the case of a suitable (pointed or sharp) construction of the connecting stub pipe 124. The compressed air connection in the clamping section 120 is denoted in FIG. 16 by 126. The axial position of the piston P of the blocking material cartridge K is detectable by a sensor 128 and it can thus be recognized when the blocking material cartridge K is empty. An empty blocking material cartridge K can be pulled away from the connecting stub pipe 124 by the closure cylinder 118 through spring-biased detent elements 130 provided at the clamping section 120 of the cylinder, whereupon the empty blocking material cartridge K drops down into a collecting container (not shown) as a consequence of gravitational force.

In order to separate the blocking material cartridges K from the magazine 36 of the feed device an axially displaceable angled wall section 132 co-operates with a pawl 134, wherein the pawl 134 prevents a full blocking material cartridge K from dropping into the collecting container when the closure cylinder 18 is opened. In order to load the receiving space 34 with a full blocking material cartridge K the wall section 132 is axially moved (downwardly in FIG. 17) while lifting the pawl 134 lying against the next blocking material cartridge K. The wall section 132 on the one hand closes the opening of the receiving space 34 towards the collecting container and on the other hand prevents slipping of a further blocking material cartridge K out of the magazine 36. As a consequence, the full blocking material cartridge K introduced into the receiving space 34 can be clamped by the closure cylinder 118 against the connecting stub pipe 124, whereupon the wall section 132 (at the top in FIG. 17) is retracted and the next blocking material cartridge K slips along.

Figure 40:
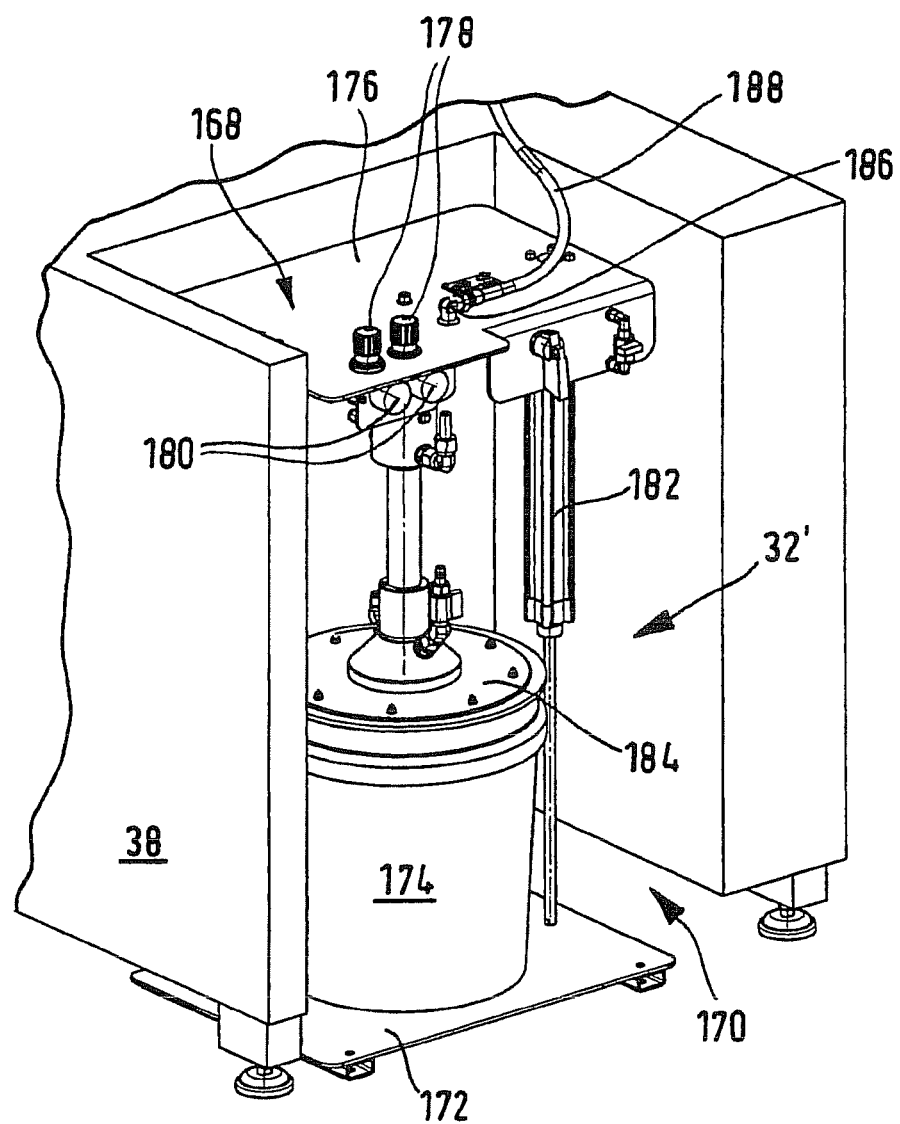
FIG. 40 shows a perspective illustration of a feed device, which is shown by itself, for the blocking material in an embodiment which is an alternative to, in particular, FIGS. 16 and 17, with a drum pumping unit.
Figure 41:
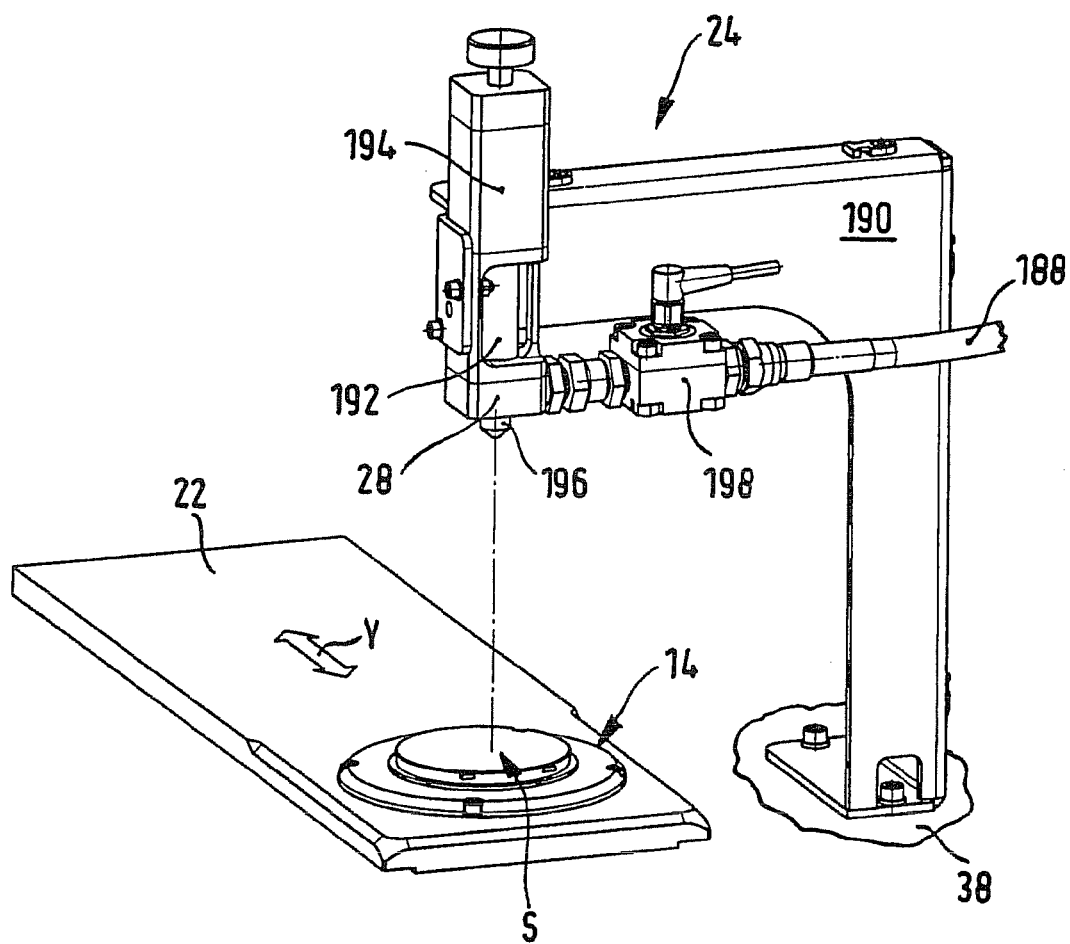
FIG. 41 shows a perspective illustration of a metering device, which is shown by itself together with the first slide of the transport device, for the blocking material in an embodiment which is alternative to, in particular, FIGS. 1, 4 and 10, with a stationary metering head, which has a needle seat valve and which is connected by a hose via a throughflow meter with the feed device according to FIG. 40.

FIGS. 40 and 41 show a construction, which is an alternative to the aforedescribed embodiment, of the blocking material supply, more precisely the feed device 32' (FIG. 40) and the metering device 24' (FIG. 41), without blocking material cartridges, associated receiving space and cartridge magazine and with a metering head 28' which is stationary, i.e. non-pivotable, with respect to the housing 38.

According to FIG. 40 the alternative feed device 32', which is to ensure operation of the blocking device 10 over several days without change of packing, has a high-pressure drum pumping unit 168, which is matched with respect to the packing size, but otherwise of proprietary kind, such as available under the trade designation "AX 5" from Dosier-und Prüftechnik GmbH, Nördlingen, Germany. The drum pumping unit 168 is arranged in a receiving space 170 of the housing 38 in the lower part of the blocking device 10 and includes a stationary base plate 172, which is near the floor and on which an exchangeable receiving container 174 for the blocking material M, such as a bucket or a large can, is placeable, and a cover plate 176, which is fixedly connected with the actual pump mechanism and movable relative to the housing 38 and at which a pressure regulator 178 and manometer 180 of the drum pumping unit 168 are also disposed. Arranged between the base plate 172 and the cover plate 176 to be effective in terms of actuation on diametrically opposite sides with respect to the longitudinal axis of the drum pumping unit 168 are two pneumatic cylinders 182 (only one of which can be seen in FIG. 40, the other being covered by the housing 38) which serve the purpose of drawing the cover plate 176 in the direction of the base plate 172. At the pump head of the drum pumping unit 168, a follower plate 184, which is sealed by a flexible wiper ring (not shown) relative to the inner wall of the receiving container 174, for removal of the blocking material M from the receiving container 174 enters in the manner of a piston into the receiving container 174. The actual removal of the blocking material M is carried out by, for example, a pneumatically controlled scoop piston pump of the drum pumping unit 168. The pump outlet 186 is connected with the metering device 24' by way of a preferably heated, flexible hose 188 (see, also, FIG. 41).

As can be seen in FIG. 41, the metering head 28' of the alternative metering device 24' is mounted on a fastening bracket 190, which in turn is mounted on the housing 38 so that the metering head 28' is disposed in stationary position with respect to the housing 38 at a defined height above the blocking station 14. A needle seat valve 192 actuable by a pneumatic cylinder 194 in order to permit or interrupt the inflow of blocking material M is arranged in the metering head 28'. A proprietary valve-cylinder unit such as is available, for example, under the trade designation "Outlet valve 401.02.01" of Hilger u. Kern GmbH, Mannheim, Germany can be used for cylinder 194. The nozzle opening at the valve head 196 is relatively small, so that the blocking material M runs in a comparatively thin strand (indicated in FIG. 41 by a dot-dashed line) onto the center of the block piece S in the blocking station 14 and there forms a small heap. On interruption of the feed through the needle seat valve 192 merely a very thin, hair-like addition to the blocking material heap arises. In the case of a suitably set viscosity of the blocking material M there is neither continued dripping nor tearing-off of the same, so that the afore-mentioned pivot movement of the metering head is superfluous.

Since the drum pumping unit 168 is ultimately only conditionally in a position of conveying the blocking material M in a precisely metered amount, according to FIG. 41 a throughflow meter 198, such as is available, for example, under the trade designation "Flowmeter OG1-SS4-VHE-B-SAT" of Titan Enterprises Ltd., Sherborne, Dorset, Great Britain, developed especially for high-viscosity liquids is additionally installed directly in front of the needle seat valve 192 of the metering head 28' and hydraulically between the needle seat valve 192 and the hose 188 coming from the drum pumping unit 168. The volume flow measured by that is processed in the control of the blocking device 10 and ultimately used for the purpose of activating the needle seat valve 192 in such a manner that only the quantity of blocking material M required for the respective spectacle lens L to be blocked is fed.

Further details of the blocking station 14 can be inferred from FIGS. 11 to 14B. According thereto the blocking station 14 comprises a first clamping ring 72, which is fastened on the first slide 22 to be secure against rotation relative thereto, with radially inwardly protruding clamping jaws 74 for engagement with the associated clamping projections V at the block piece S to be held (see FIGS. 19 and 20) and a second clamping ring 76, which is arranged below the first clamping ring 72 and rotatable with respect to the first clamping ring 72 against spring bias (tension springs 136) and which bears against the first clamping ring 72, the second clamping ring having radially extending clamping projections 78 by way of which the clamping projections V of the block piece S bearing against the clamping jaws 74 of the first clamping ring 72 in the received state of the block piece S can be clamped. Formed at the clamping projections 78 of the second clamping ring 76 (and, as an introduction aid, optionally also at the clamping jaws 74 of the first clamping ring 72) are inclined surfaces 138 by way of which rotation of the second clamping ring 76 relative to the first clamping ring 72 is produced when the block piece S is pressed into the blocking station 14.

Figure 38:
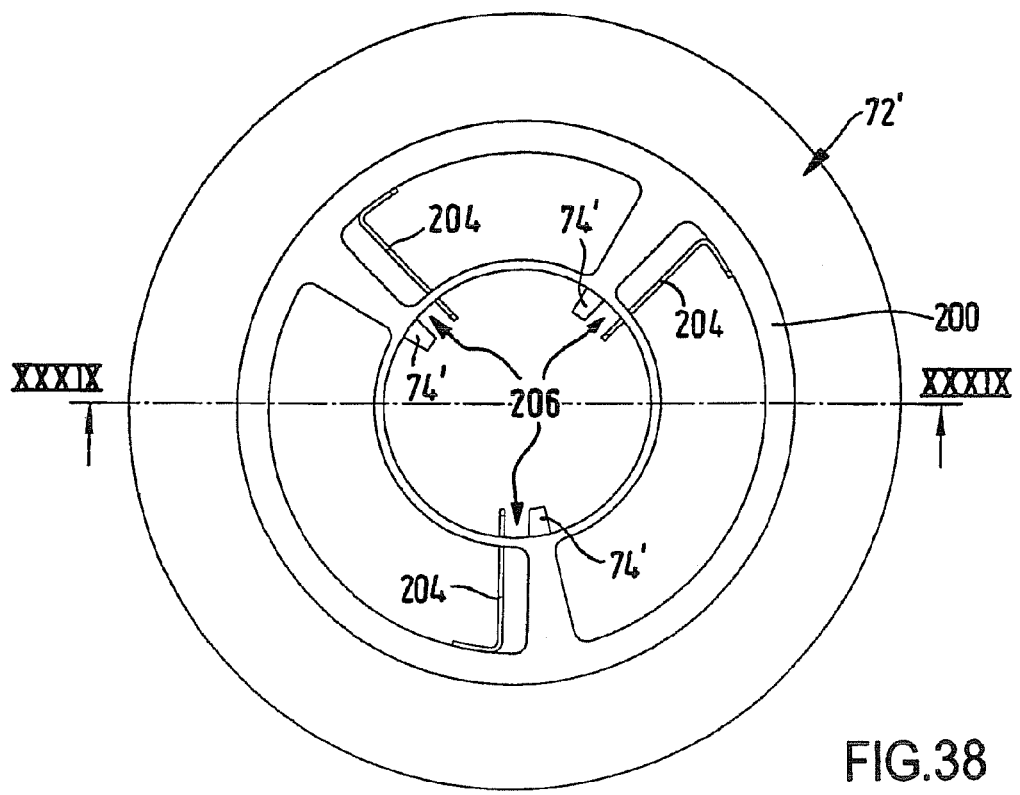
FIG. 38 shows a plan view of the clamping device of the blocking station in an embodiment which is an alternative to FIGS. 11 to 14B, without a support ring of the block piece.
Figure 39:
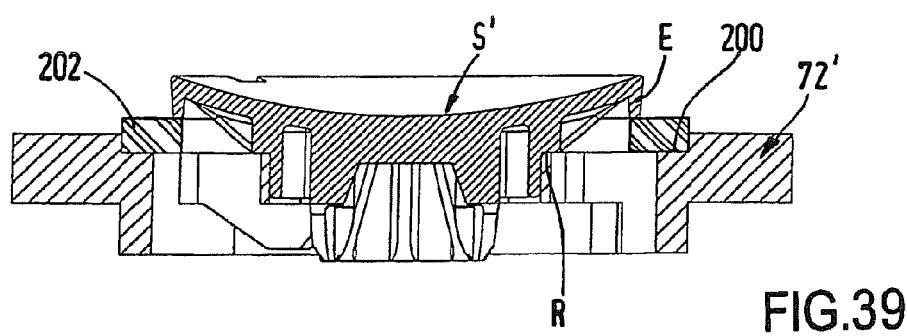
FIG. 39 shows a sectional view of the alternative clamping device of the blocking station in correspondence with the section line XXXIX-XXXIX in FIG. 38, with a glass support ring and a block piece, which is inserted into the clamping device and which is slightly modified by comparison with the block piece shown in more detail in FIGS. 10, 12, 19 and 20.

FIGS. 38 and 39 show a design of the clamping device of the blocking station 14 which is an alternative to the preceding description and which is optimized particularly with respect to a largest possible incidence of light from the exposure device 26 on the block piece S' (cf. FIG. 10), i.e. a smallest possible shading. Accordingly, the clamping device for the block piece S' comprises merely one clamping ring 72', which is mounted in stationary position on the first slide 22, with a central cut-out 200 into which a preferably transparent support ring 202 of, for example, glass is inserted. Three leaf spring elements 204 are provided instead of the rotationally movable second clamping ring and, in particular, a leaf spring element 204 fastened in suitable manner to the clamping ring 72' is so associated with each clamping jaw 74' of the clamping ring 72' that the elements bound a slight "spring-back" gap 206 for the respective clamping projection V of the block piece S' (cf. FIGS. 19 and 20). Ultimately, the leaf spring elements 204 ensure that the clamping projections V of the block piece S' inserted in the clamping device bear free of play against the clamping jaws 74' of the clamping ring 72'.

The slightly modified block piece S' illustrated in FIG. 39 otherwise differs from the block piece S which is shown in, in particular, FIGS. 10, 12, 19 and 20 only in that it has at the outer edge an annular web E by way of which the block piece S' inserted into the clamping device of the blocking station 14 can also be supported—apart from its "central" support by the annular reference surface R at the clamping ring 72'—radially outwardly at the clamping ring 72', more precisely the support ring 202 held at the clamping ring 72'. With this additional support of the block piece S' there is reliable avoidance of deformation of the block piece S' in undesired manner when the spectacle lens L is pressed during the blocking process into the still-liquid blocking material M applied to the block piece S'.

According to FIGS. 1 to 4, 9 and 18, for further automation of the blocking device 10 a loading unit 50 is provided in front of the housing 38 of the blocking device 10. The loading unit feeds both the spectacle lenses L and the block pieces S to the blocking device 10 and additionally the spectacle lenses L blocked on the block pieces S can be removed from the blocking device 10. As can be seen particularly in FIG. 18, the loading unit 50 comprises a loading arm 52 with a longitudinal axis 54, at which a loading head 56 together with at least one sucker 58, in the illustrated exemplifying embodiment two suckers 58 disposed diametrically opposite with respect to the longitudinal axis 54, is or are mounted to be rotatable through 180° about the longitudinal axis 54 of the loading arm 52, wherein the loading arm 52 itself is pivotable about a pivot axis 60 extending perpendicularly to the longitudinal axis 54 of the loading arm 52 and is manually adjustable along the pivot axis 60, i.e. upwardly and downwardly in FIG. 18. In addition, the suckers 58 can be rotated about an axis extending through the two suckers 58, which allows, in particular, a positionally correct insertion of the block piece S into the blocking station 14 and into a work box 140, which is placed on a conveyor belt 142 arranged in front of the blocking device 10. The rotation about the latter axis is produced by the step motor and gearwheel transmission (neither shown). Pivotation of the loading arm 52 about the pivot axis 60 is similarly carried out by a stepping motor and gearwheel transmission (neither illustrated). By contrast, the stroke movement of the loading arm 52 (up/down) is carried out pneumatically by a pressure-controlled cylinder (not shown).

Moreover, provided between the housing 38 of the blocking device 10 and the conveyor belt 142 according to FIGS. 1 to 4, 9 and 18 is a vertical unit 62 for taking over a spectacle lens L, which is to be blocked, from the loading unit 50 and transfer of the spectacle lens L, which is to be blocked, to the support 46, which is disposed in the transfer position (FIG. 4), with the gripper 48 on the second slide 44 of the transport device 18. According to FIG. 18 the vertical unit 62 comprises two mutually adjacent stroke cylinders 144, 146, of which one stroke cylinder 144 (in the illustrated embodiment, without a piston) is capable of executing a large stroke by comparison with the other stroke cylinder 146, while the other stroke cylinder 146 is designed for execution of a comparatively smaller stroke and carries a sucker 148 for holding the spectacle lens L. A spectacle lens L turned by the loading unit 50 can be removed by the sucker 148 from the loading unit 50 and then deposited on the support 46 after downward movement of the stroke cylinders 144, 146. In this regard, the stroke cylinder 144 initially travels downwardly to the end abutment, whereafter the smaller stroke cylinder 146 lowers the spectacle lens L at low pressure slowly onto the support 46.

Figure 15:
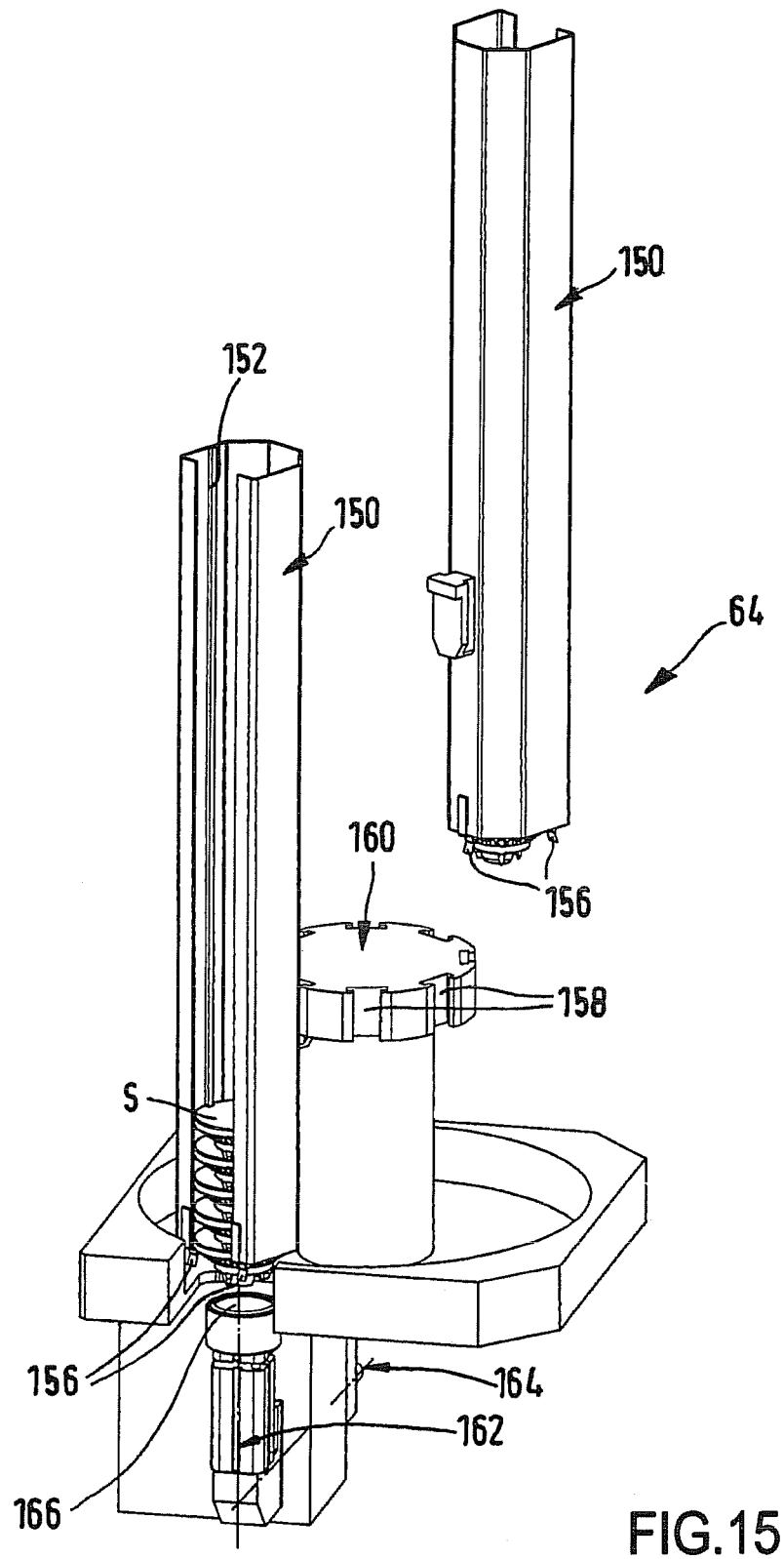
FIG. 15 shows a perspective illustration of the block piece magazine, which is shown by itself, of the blocking device with removed stack store.
Figure 16:
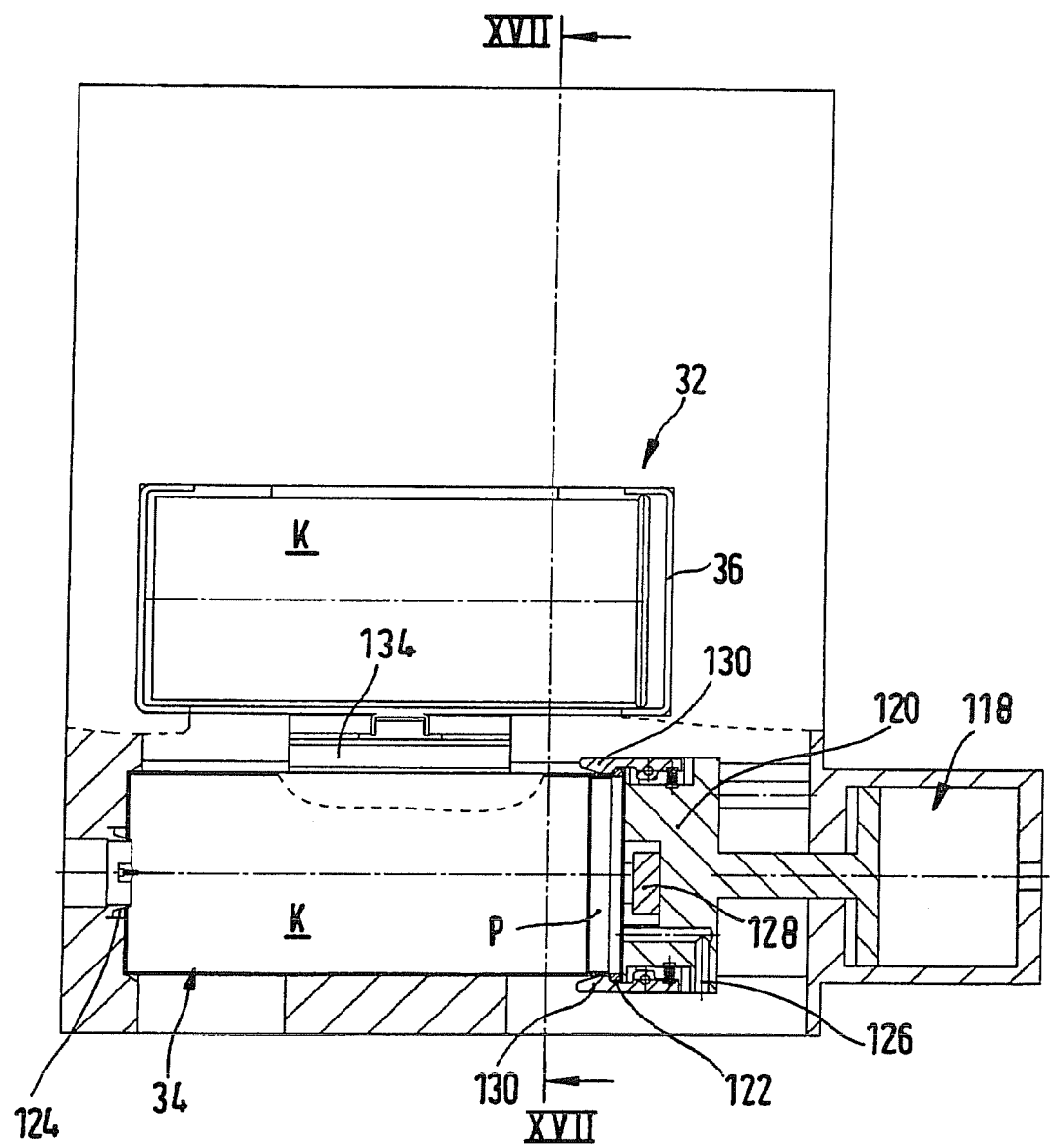
FIG. 16 shows a partly broken-away plan view of the feed device, which is illustrated by itself, of the blocking device according to the detail XVI in FIG. 9.
Figure 17:
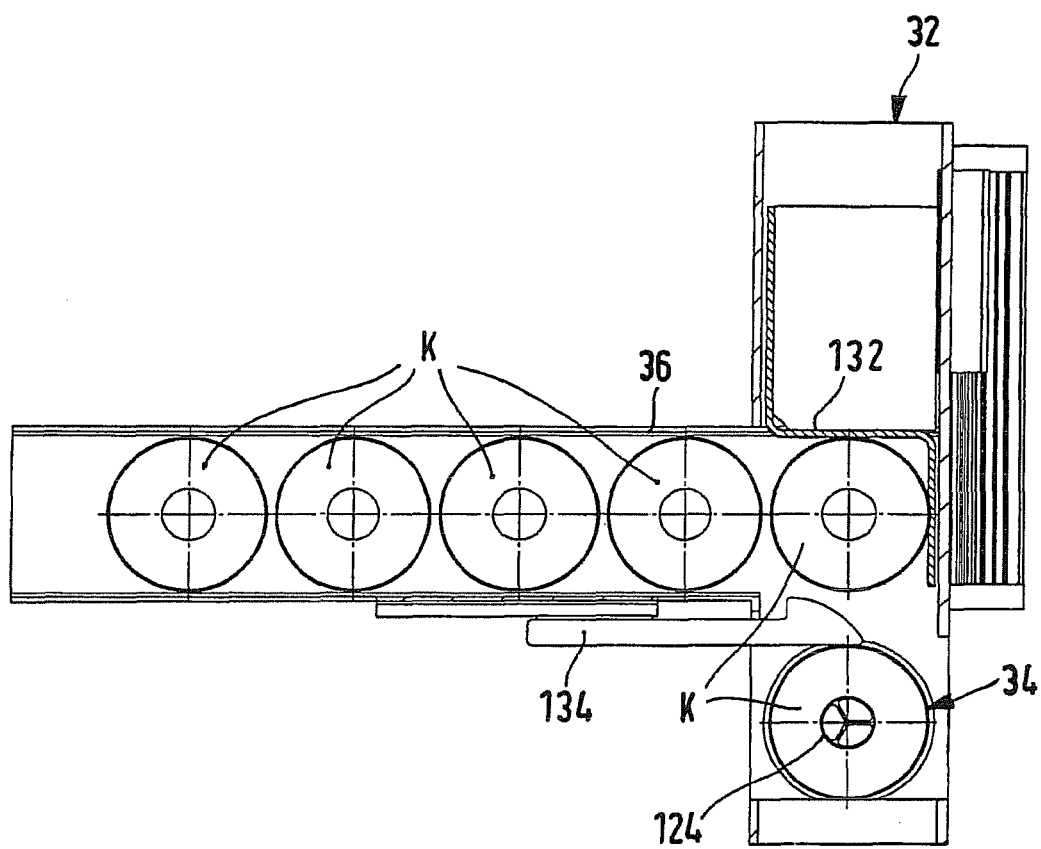
FIG. 17 shows a sectional view (turned in the drawing plane through 90° in counter-clockwise sense) of the feed device of FIG. 16 in correspondence with the section line XVII-XVII in FIG. 16, with five blocking material cartridges in the magazine and one blocking material cartridge in the receiving space of the feed device.
Figure 18:
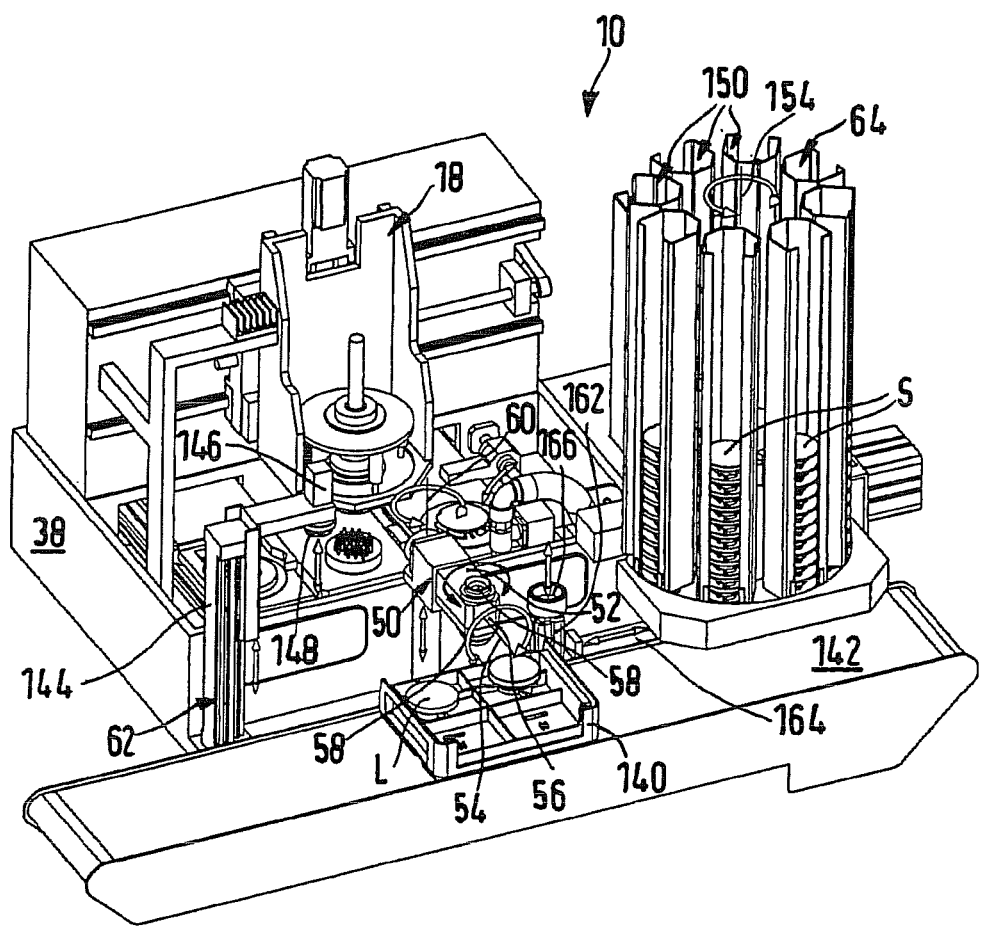
FIG. 18 shows a perspective view, which is similar to FIG. 1, of the blocking device from left above, for illustration of the movement possibilities of the handling and automating devices provided additionally to the transport device, namely the loading unit, the vertical unit and the block piece magazine.

According to FIGS. 1, 2, 9 and 18, but particularly FIG. 15, the blocking device 10 has a block piece magazine 64 for reception of a plurality of, optionally also different, block pieces S, from which a predetermined block piece S can be automatically separated and transferred to the loading unit 50, whereupon the block piece S is insertable by the loading unit 50 into the blocking station 14, which is disposed in the transfer position (FIG. 4), on the first slide 22 of the transport device 18. In the illustrated exemplifying embodiment the block piece magazine 64 has eight magazine bars 150 which can have a respective, differently arranged coding strip 152 (FIG. 15) for reception of different block pieces S (with different blocking surface radii). The magazine bars 150 are rotatable and indexable in the block piece magazine 64 about a magazine axis 154 (arrow in FIG. 18). The magazine bars 150 are provided at the lower ends thereof with clamping springs 156 (FIG. 15) which prevent slipping of the block pieces S out of the respective magazine bar 150. The magazine bars 150 can be loaded beforehand and then hung in an associated T-shaped groove 158 in a magazine bar carrier 160. Removal of each block piece S takes place from below by a vertical pneumatic cylinder 162, which in turn is seated on a horizontal pneumatic cylinder 164 and has a sucker 166 for the block piece S. The block piece S held at the sucker 166 can be moved by the horizontal pneumatic cylinder 164 into a transfer position (FIG. 18). The loading unit 50 can take over the block piece S for transport to the blocking station 14. The feed of block pieces S can thus also be carried out fully automatically, in which connection a sufficient quantity of block pieces S can be stored at the block piece magazine 64.

Figure 20:
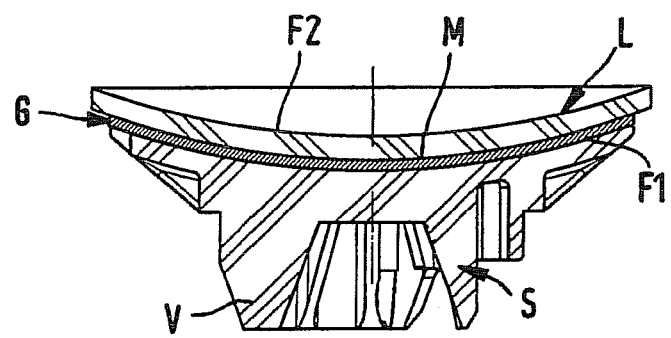
FIG. 20 shows a sectional view of a spectacle lens blocked on a block piece.

As a result, there is created a blocking device 10 in which an automatic feed of spectacle lens blanks L from work boxes 140, automatic alignment thereof in the blocking device 10 itself and also the feed of blocking material M and block pieces S can be carried out fully automatically. The spectacle lens L can be oriented in three-dimensions prior to the actual blocking, for example for a prismatic blocking, by the transport device 18. In the case of for example, a decentral blocking the first slide 22 together with the block piece S held in the blocking station 14 moves, for example, by the amount of the decentration. The cross-table arrangement 20 lowers the holding head 16 together with the spectacle lens L onto the block piece S. The blocking material M is displaced from the inside in outward direction until the previously calculated spacing between spectacle lens L and block piece S is achieved. Ultraviolet light exposure of the blocking material M is now carried out from below, optionally with several light pulses, in order to produce the bond between spectacle lens L and block piece S as is shown in FIG. 20.

One possible, fully automatic blocking process with the blocking device 10 according to FIGS. 1 to 18 shall be described in the time sequence thereof in sample point manner in the following with reference to FIGS. 21 to 37, wherein only those reference numerals denoting the components or subassemblies discussed in this connection have been used in the figures.

Figure 21:
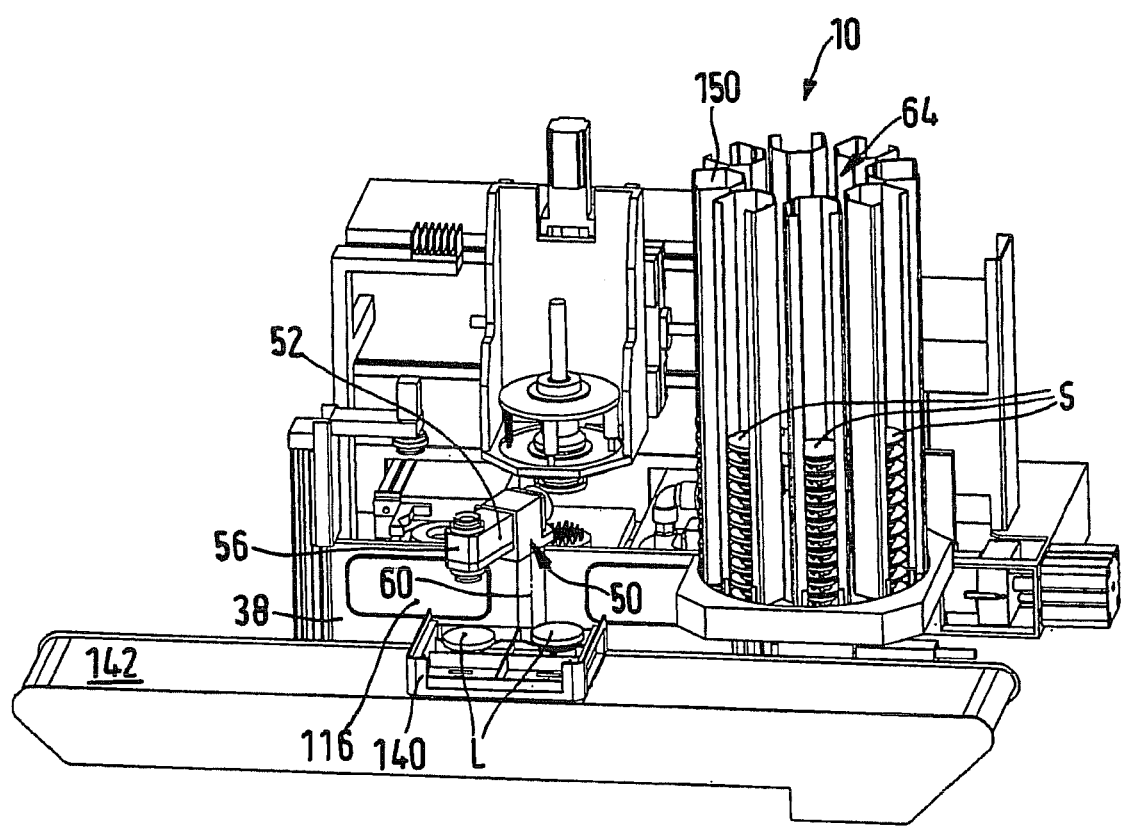
FIGS. 21 to 37 show perspective views of the blocking device according to the invention, which illustrate one possible fully automated blocking process in the time sequence thereof.

FIG. 21: A work box 140 in which two spectacle lenses L to be blocked are disposed stands on the conveyor belt 142 in front of the blocking device 10. The loading arm 52 of the loading unit 50 pivots about the pivot axis 60 until the loading head 56 is disposed above the spectacle lens L to be blocked first. The block piece magazine 64 rotates the magazine bar 150 with the block pieces S to be taken for this blocking process into the removal position (not visible).

Figure 22:
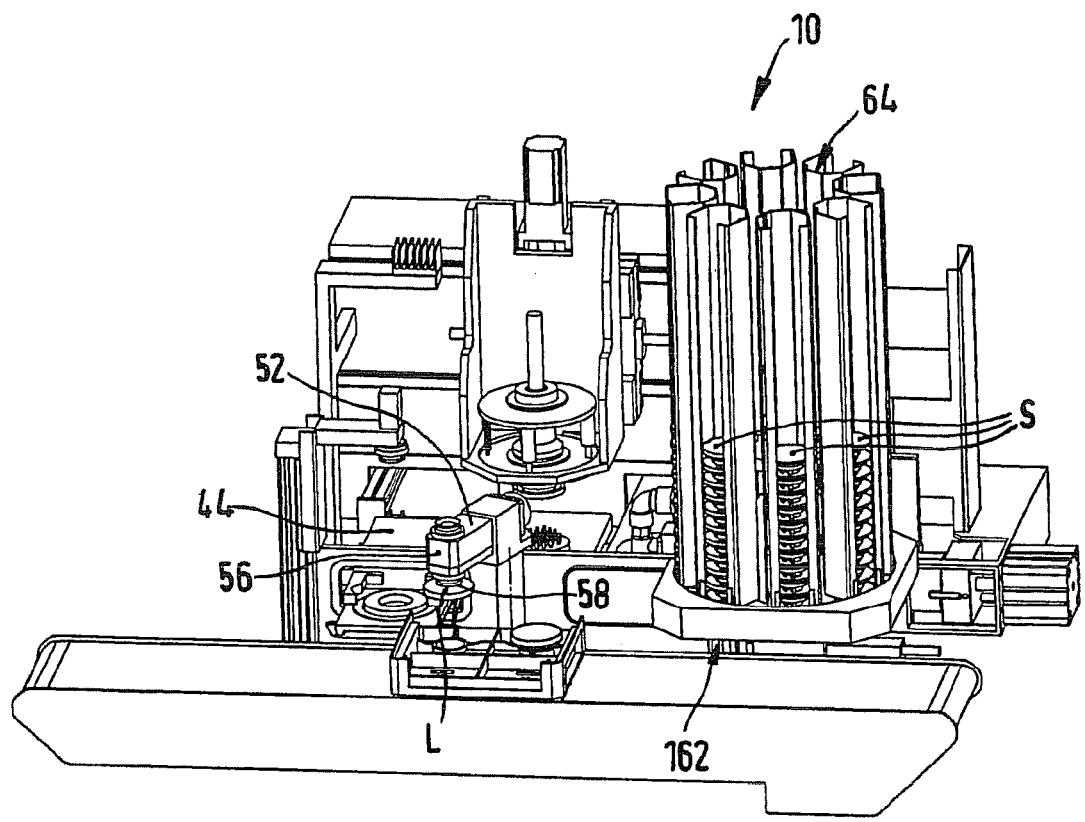

FIG. 22: The loading arm 52 travels downwardly in order to suck on the spectacle lens L by the sucker 58 at the loading head 56 and then travels, together with the spectacle lens L attached by suction, upwardly again. The second slide 44 travels forwardly into the loading position, wherein the lefthand flap 116 (see FIG. 21) in the housing 38 opens. The vertical pneumatic cylinder 162 (cf. FIG. 15) draws a block piece S, which is attached by suction to the sucker 166, downwardly out of the block piece magazine 64 (not visible).

Figure 23:
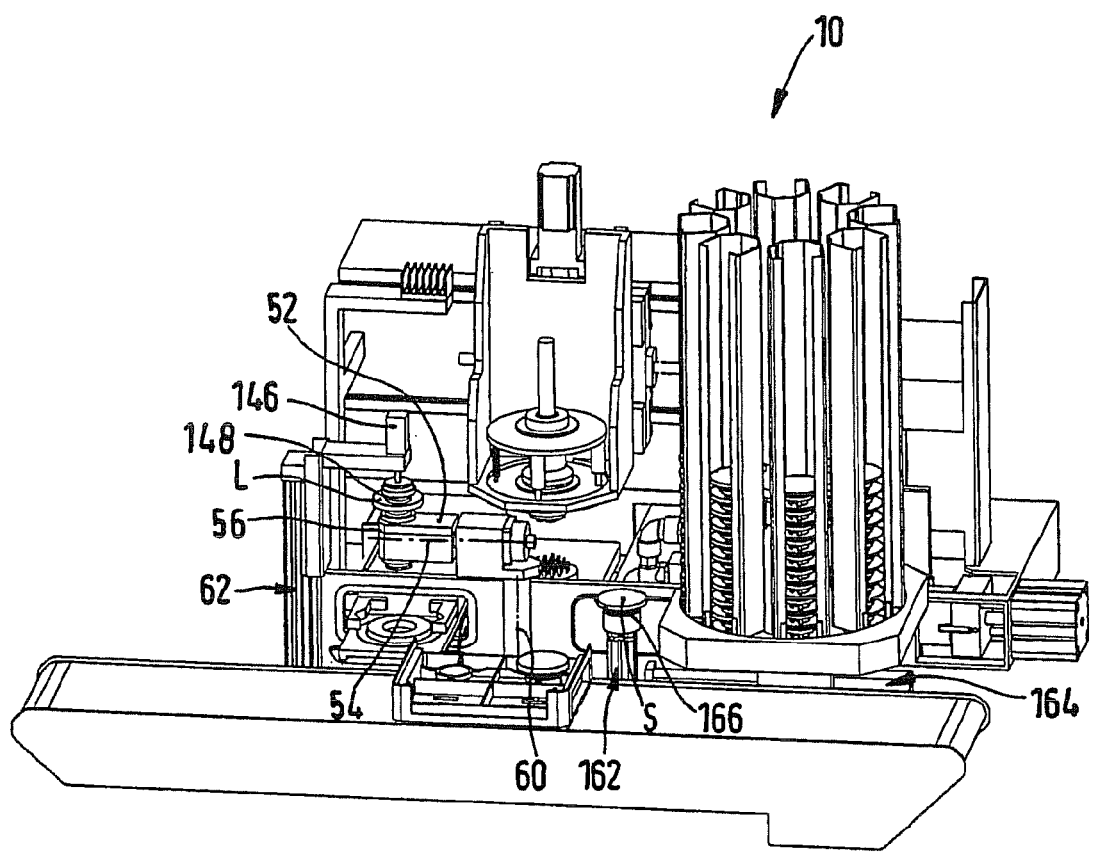

FIG. 23: The loading head 56 pivots through 180° about the longitudinal axis 54 of the loading arm 52 so that the spectacle lens L attached by suction is disposed at the top. The loading arm 52 pivots about the pivot axis 60 into the transfer position below the stroke cylinder 146 of the vertical unit 62. The stroke cylinder 146 travels downwardly and the spectacle lens L is sucked on by the sucker 148. The block piece S held at the sucker 166 is moved by the horizontal pneumatic cylinder 164 and the vertical pneumatic cylinder 162 into the transfer position on the pivot circle of the loading arm 52.

Figure 24:
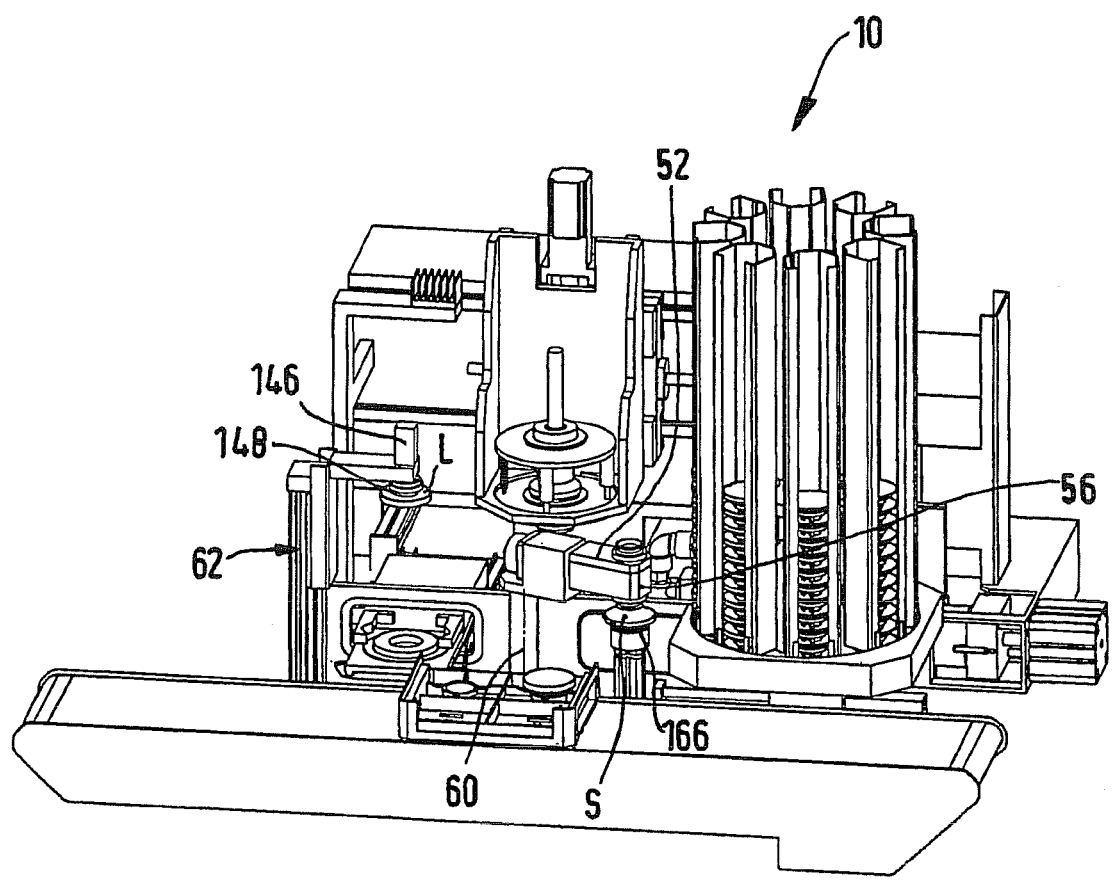

FIG. 24: The stroke cylinder 146 of the vertical unit 62 draws the spectacle lens L, which is held at the sucker 148, upwardly. The loading arm 52 pivots about the pivot axis 60 into the block piece transfer position in which the loading head 56 is disposed above the block piece S held at the sucker 166.

Figure 25:
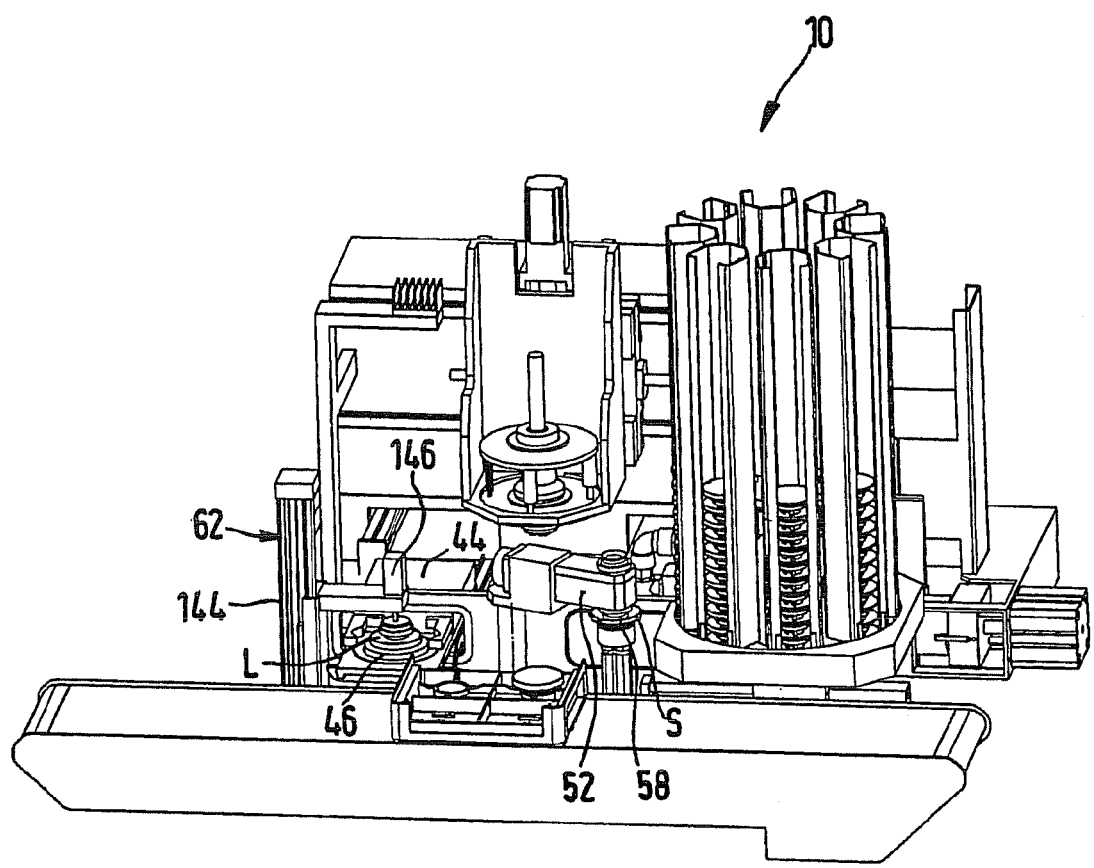

FIG. 25: The large stroke cylinder 144 of the vertical unit 62 travels downwardly, whereupon the small stroke cylinder 146 of the vertical unit 62 with lower pressure travels downwardly in order to deposit the spectacle lens on the deposit 46 on the second slide 44. The loading arm 52 travels downwardly and the block piece S is sucked on by the sucker 58.

Figure 26:
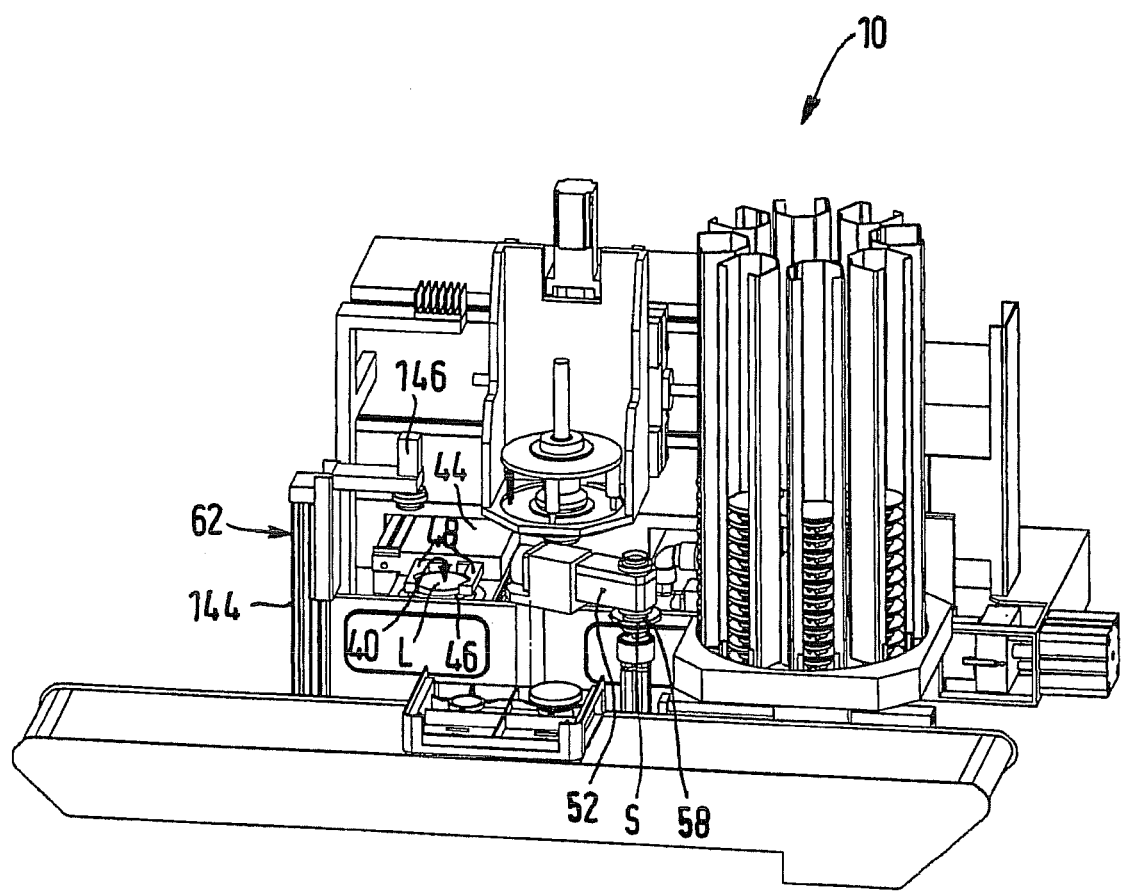

FIG. 26: The stroke cylinders 144, 146 of the vertical unit 62 travel upwardly. The spectacle lens L is centered by the (parallel) grippers 48 on the deposit 46, whereupon the second slide 44 moves rearwardly into measuring position above the optical measuring device 40 of the measuring station 12, where the spectacle lens L is optically measured. The loading arm 52 together with the block piece S held at the sucker 58 travels upwardly.

Figure 27:
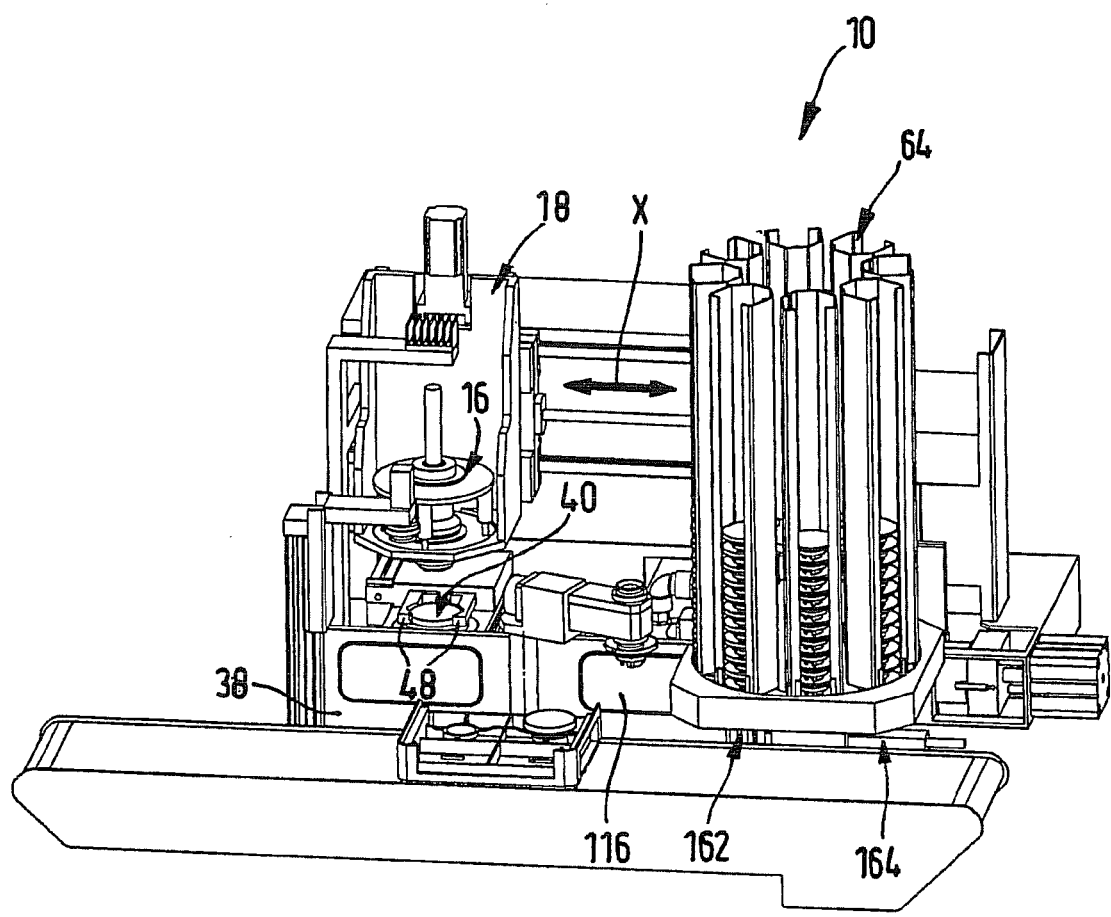

FIG. 27: The holding head 16 of the transport device 18 is moved along the linear axis X above the optical measuring device 40 and the grippers 48 are opened (not shown). The sucker 166 (not illustrated; cf. FIG. 15) is moved by the vertical pneumatic cylinder 162 and the horizontal pneumatic cylinder 164 into block piece removal position below the block piece magazine 64.

Figure 28:
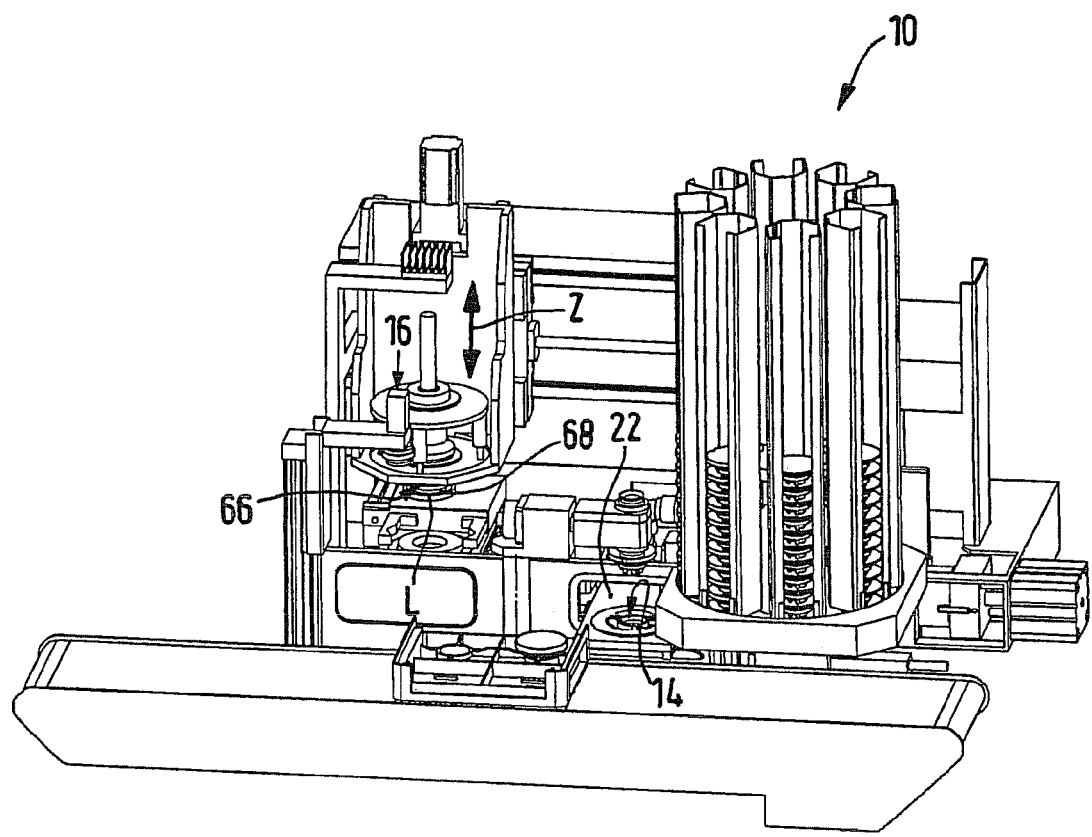

FIG. 28: The holding head 16 is moved downwardly along the linear axis Z, wherein the lens clamping unit 66 with the pin relief 70 rests on the contact surface F2 of the spectacle lens L (not shown: cf. FIG. 10). If vacuum is present at the suction lip 68 of the lens clamping unit 66 the pin relief 60 is clamped (cf. FIGS. 7 and 8 with associated description). The holding head 16 together with the spectacle lens L attached by suction then travels upwardly along the linear axis Z. The first slide 22 together with the blocking station 14 moves forwardly into transfer position (linear axis Y), wherein the righthand flap 116 (see FIG. 27) in the housing 38 opens.

Figure 29:
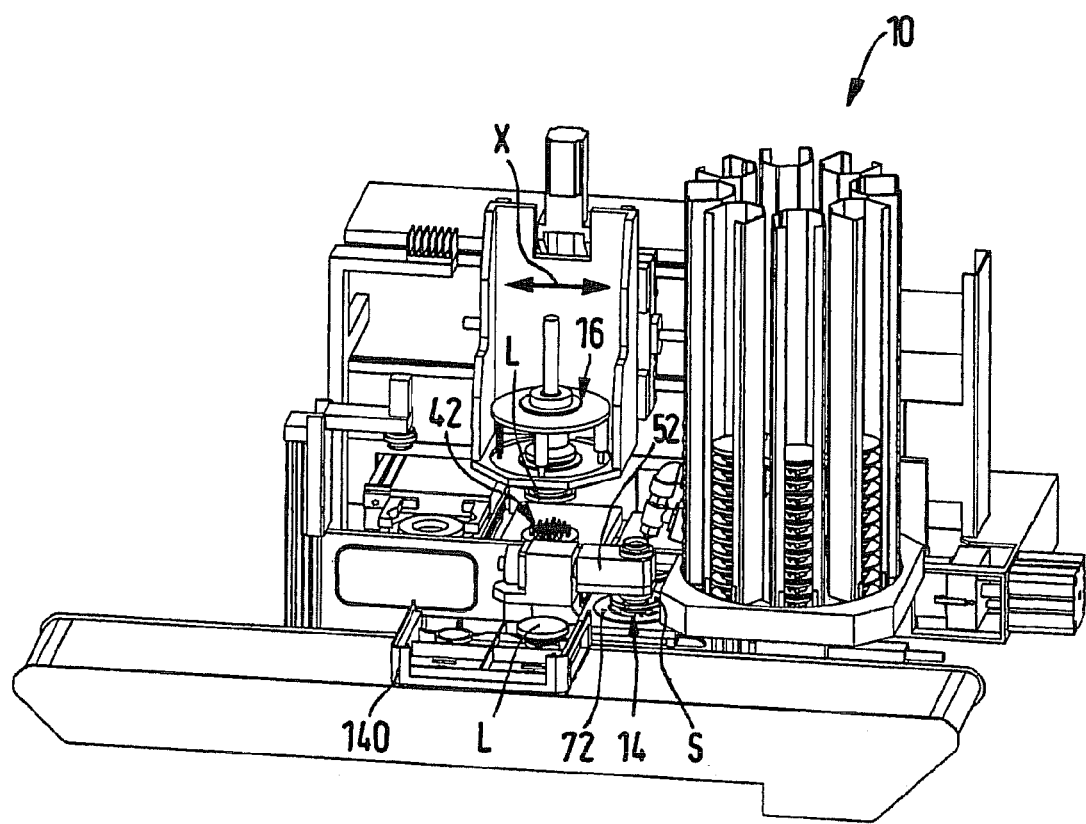

FIG. 29: The holding head 16 is moved along the linear axis X together with the spectacle lens L, which is attached by suction, over the mechanical measuring device 42 of the measuring station 12. The loading arm 52 together with the sucked-on block piece S travels downwardly in order to clamp the block piece S at the clamping ring 72 of the blocking station 14, whereupon the loading arm 52 without block piece S moves up again. The loading arm 52 is now free for the further spectacle lens L in the work box 140, which can be handled as described above (this is therefore not shown further in the following figures).

Figure 30:
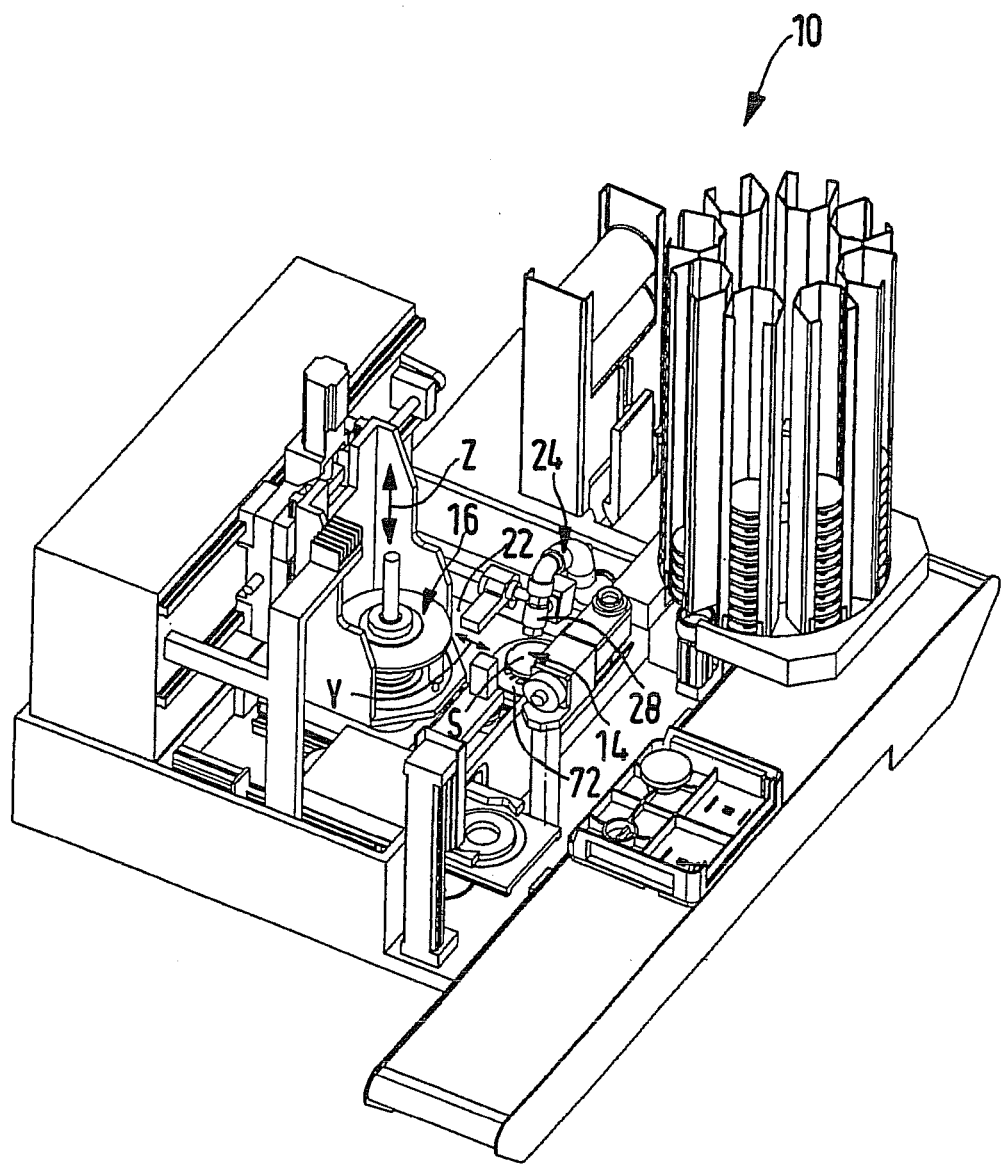

FIG. 30: The holding head 16 is moved downwardly along the linear axis Z in order to bring the spectacle lens L attached by suction into contact with the mechanical measuring device 42 of the measuring station 12 (not able to be seen). The geometry of the workpiece surface F1, which is to be blocked, at the spectacle lens L is now detected by the mechanical measuring device 42. The first slide 22 moves the blocking station 14 into a middle setting, namely the metering position (linear axis Y), in which the block piece S clamped at the clamping ring 72 is disposed below the metering head 28 of the metering device 24.

Figure 31:
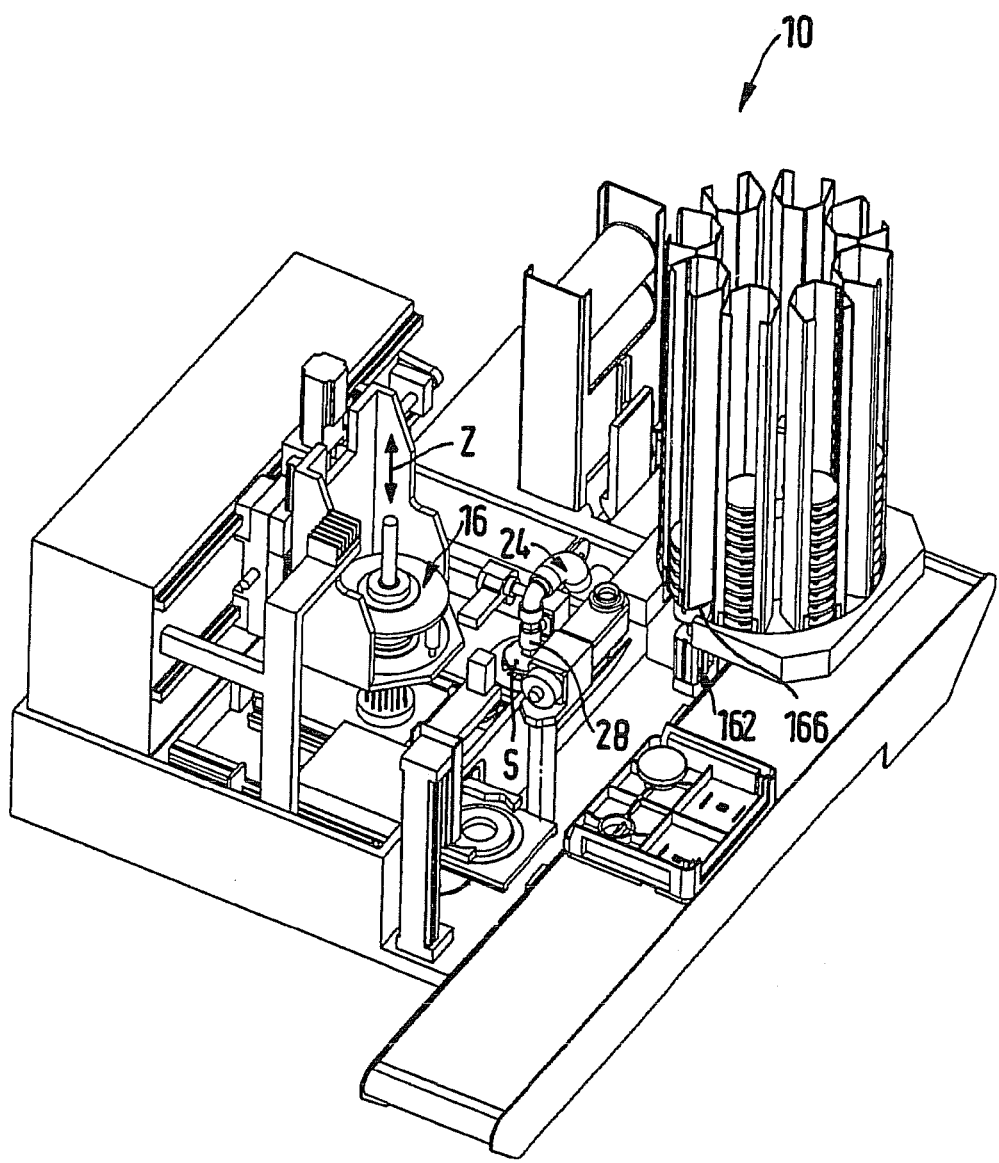

FIG. 31: The holding head 16 together with the spectacle lens L attached by suction is moved upwardly along the linear axis Z. The metering head 28 of the metering device 24 is pivoted over the block piece S (cf. the pivot axis indicated in FIG. 19 by a dot-dashed line). The sucker 166 is moved upwardly by the vertical pneumatic cylinder 162 so that the next block piece S can be sucked on.

Figure 32:
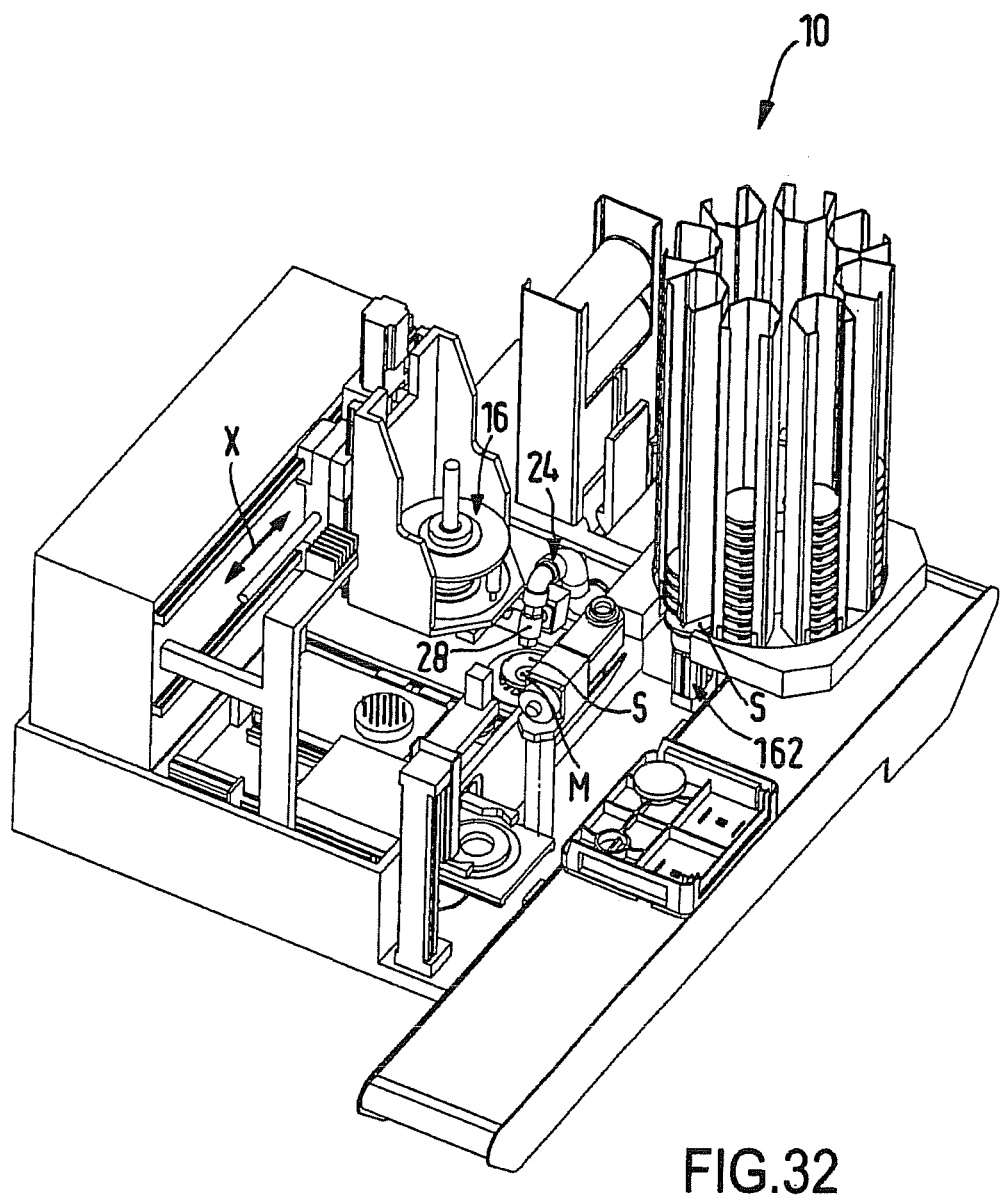

FIG. 32: The holding head 16 together with the spectacle lens L attached by suction is moved along the linear axis X over the calculated (X) blocking position. The blocking material M is applied in a predetermined amount to the block piece S by the metering head 28 of the metering device 24, whereupon the metering head 28 is pivoted back. The next block piece S sucked on by the sucker 166 is moved downwardly by the vertical pneumatic cylinder 162.

Figure 33:
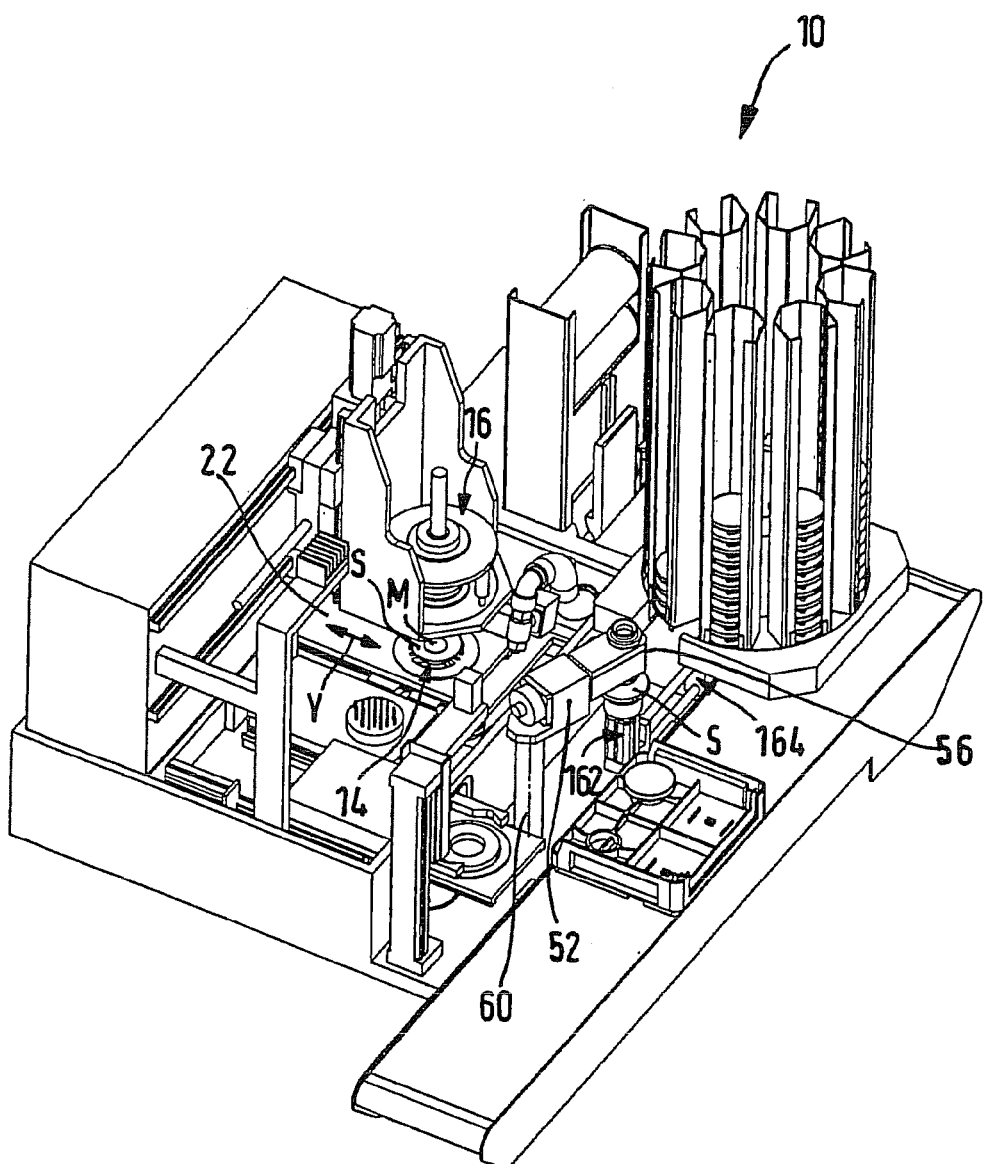

FIG. 33: The first slide 22 together with the blocking station 14 moves rearwardly along the linear axis Y into the calculated (Y) blocking position in order to position the block piece S below the spectacle lens L held at the holding head 16. The next block piece S sucked on by the sucker 166 is moved by way of the pneumatic cylinders 162, 164 into the transfer position. The loading arm 52 pivots the loading head 56 about the pivot axis 60 to the transfer position for the next block piece S.

Figure 34:
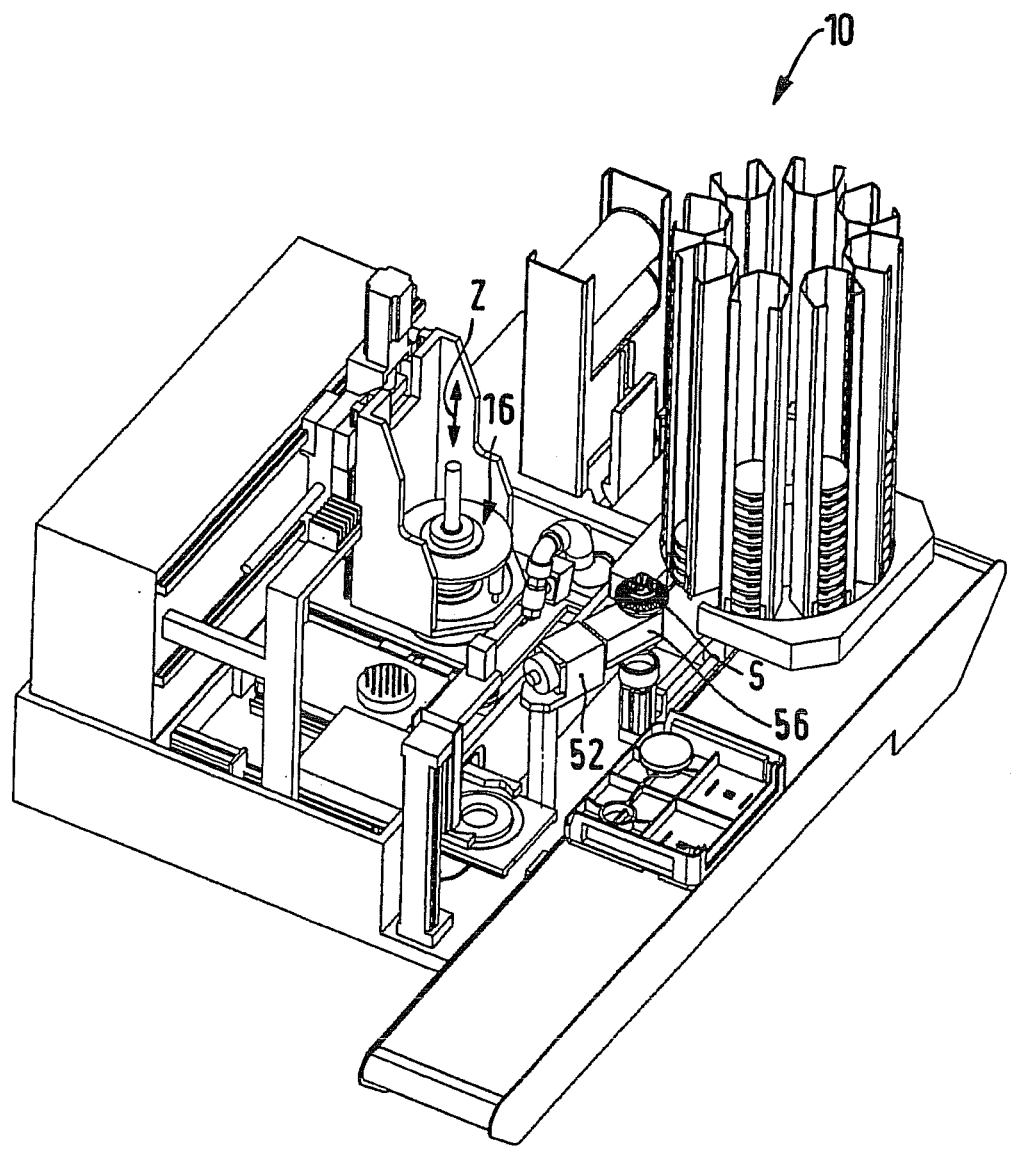

FIG. 34: The holding head 16 together with the spectacle lens L attached by suction, which in a given case was or is now positioned in three dimensions by tilting about the tilt axes A, B and rotation about the rotational axis C as calculated in terms of angle (cf. in particular, FIGS. 5 and 6 with associated description), is moved along the linear axis Z into the calculated (Z) blocking position, wherein the spectacle lens L is pressed by its workpiece surface F1, which is to be blocked, into the blocking material M, which is applied to the block piece S, while leaving the blocking material receiving gap G (see for this purpose also FIG. 20). The exposure device 26 (cf. FIG. 10) is activated and the blocking material M is cured by ultraviolet light. The loading arm 52 moves downwardly in order to take over the next block piece S and then travels upwardly again, whereupon the loading head 56 is pivoted through 180° so that the sucked-on next block piece S is disposed at the top.

Figure 35:
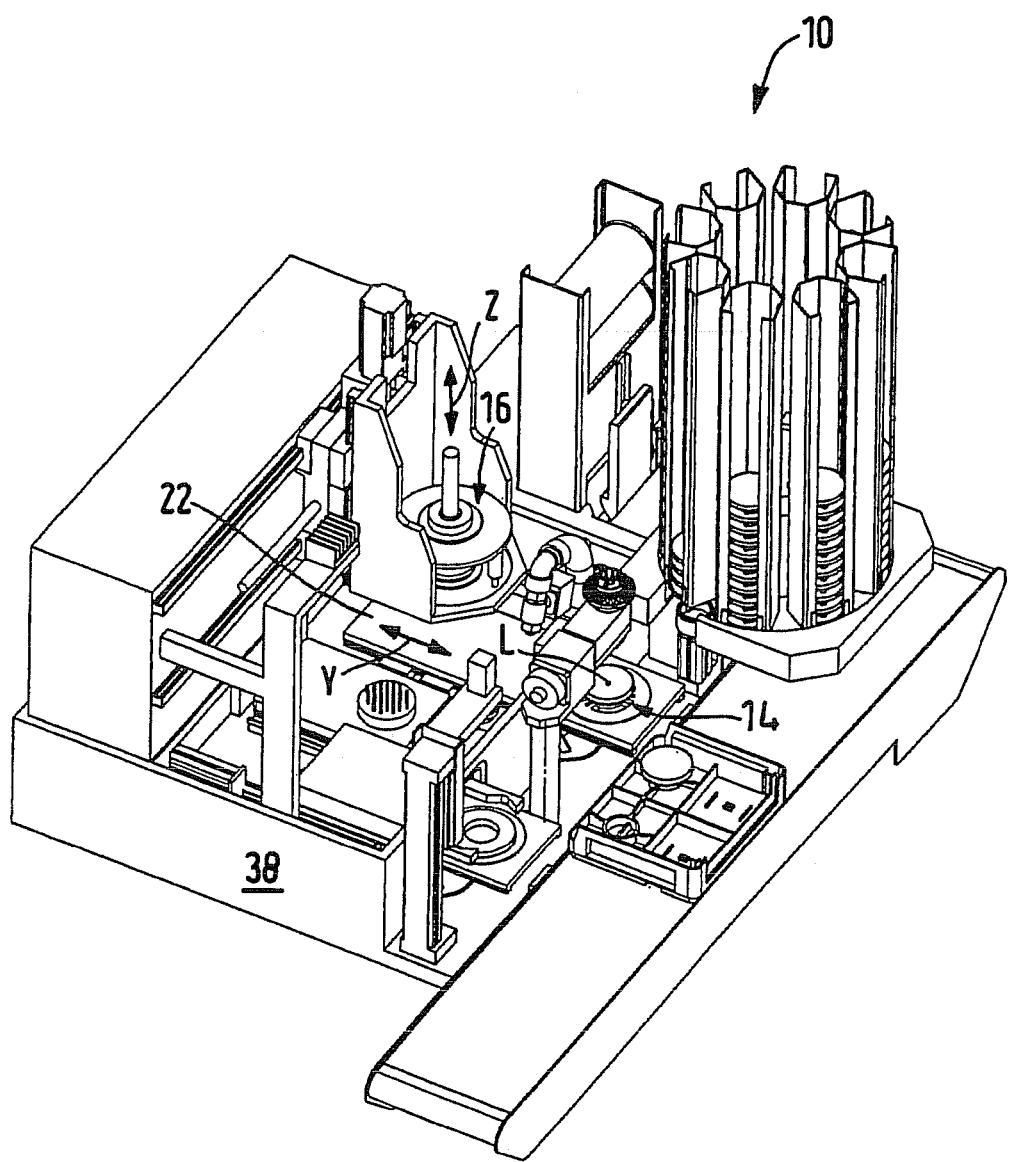

FIG. 35: The vacuum in the holding head 16 is switched off in order to release the sucked-on spectacle lens L. The holding head 16 is moved upwardly along the linear axis Z. The first slide 22 moves the blocking station 14 forwardly out of the housing 38 into the transfer position (linear axis Y).

Figure 36:
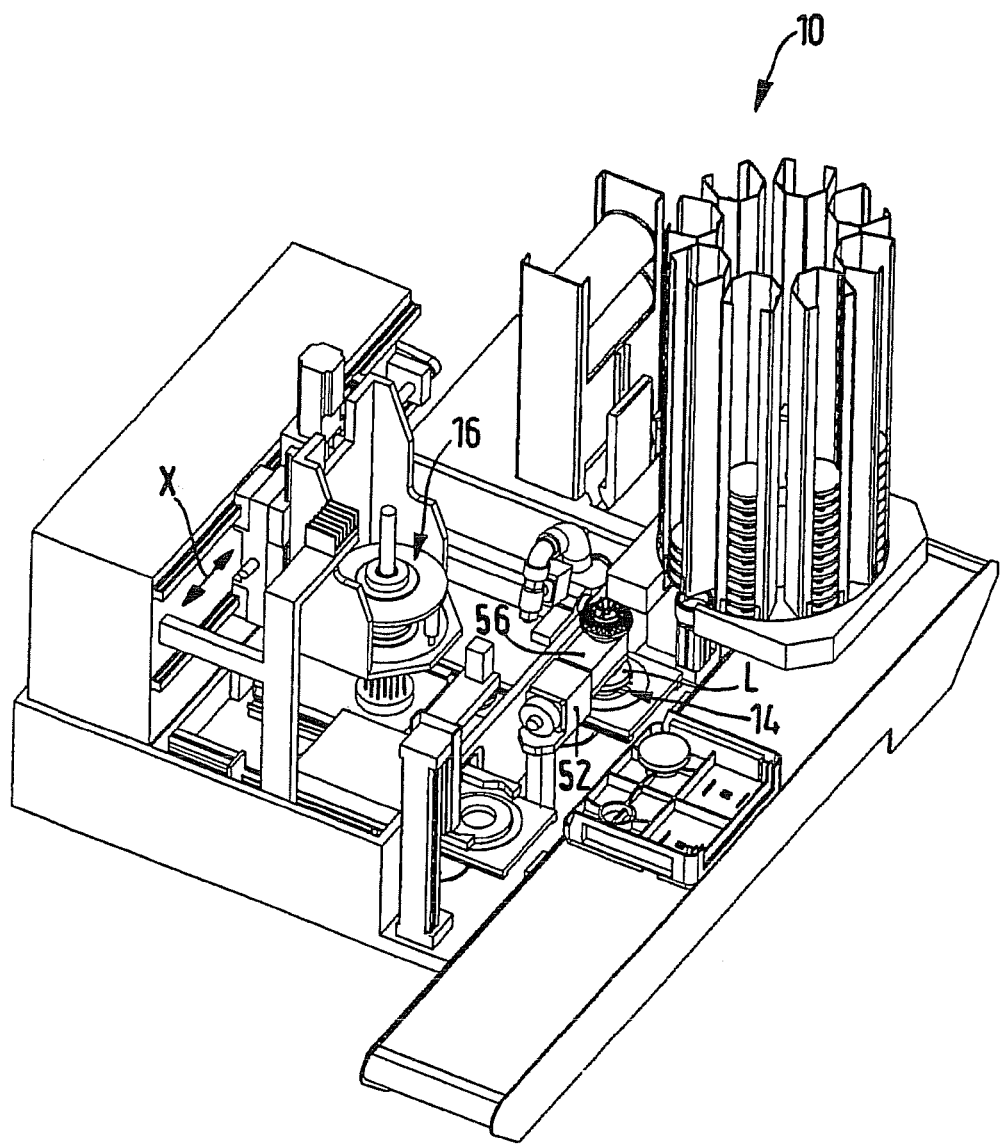

FIG. 36: The holding head 16 is moved along the linear axis X over the optical measuring device 40 of the measuring station 12. The loading arm 52 travels downwardly in order to remove the spectacle lens L, which is blocked on the block piece S, from the blocking station 14 and then travels back upwardly, whereupon the loading head 56 is pivoted through 180° so that the blocked spectacle lens L is disposed at the top. The loading arm 52 then moves back down again in order to deposit the next block piece S, which is attached by suction at the loading head 56, in the blocking station 14, whereupon the loading arm 52 moves upwardly again.

Figure 37:
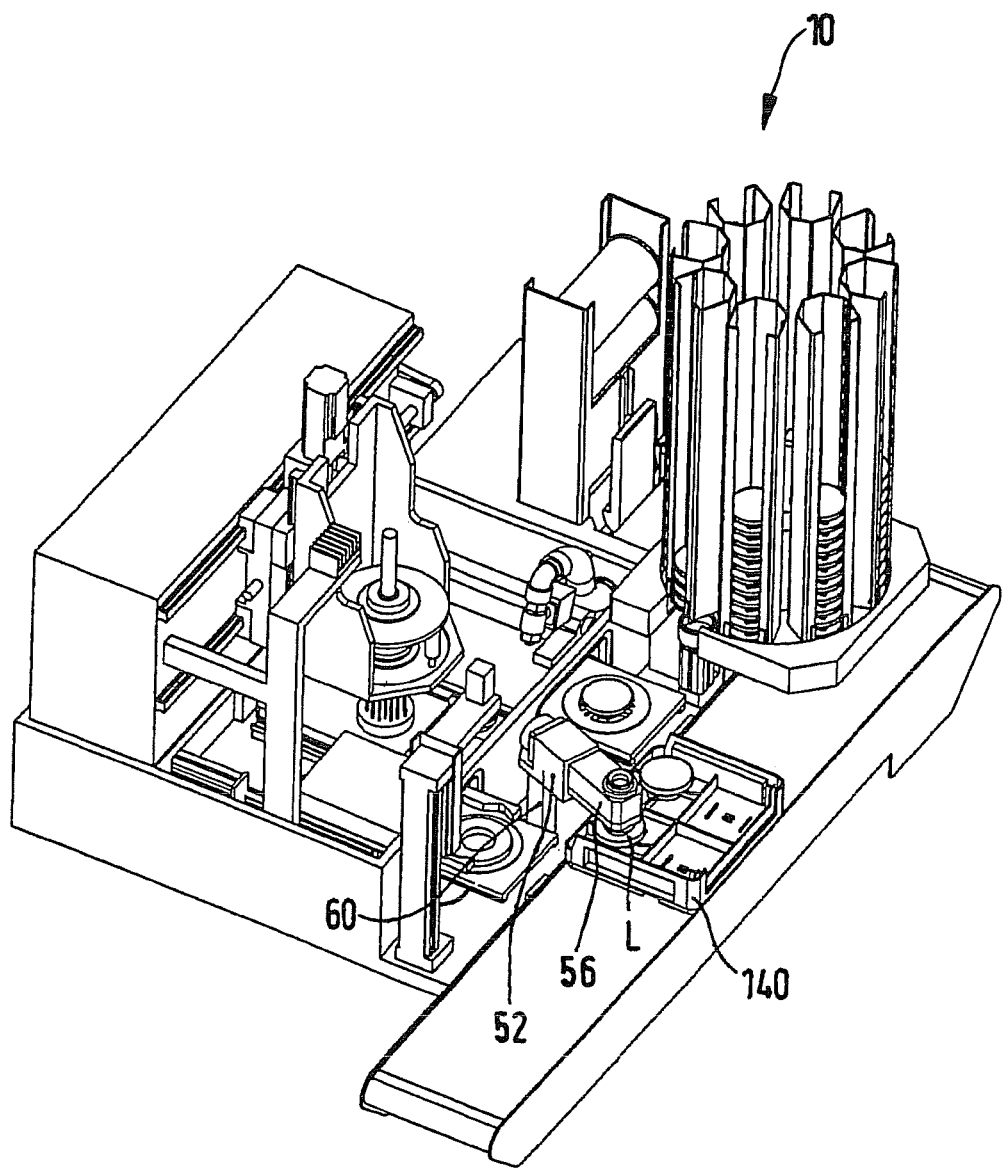

FIG. 37: The loading head 56 is pivoted through 180° so that the spectacle lens L blocked on the block piece S is disposed at the bottom, whereupon the loading arm 52 is pivoted about the pivot axis 60 over the work box 140. The loading arm 52 then moves downwardly and the vacuum is switched off in order to deposit the blocked spectacle lens L in the work box 140.

Although there was explicit discussion above of a blocking material curable by light, it will be evident to the expert that in principle other blocking materials can also be used. Thus, for example, a thermoplastic blocking material such as polycaprolactone or the like (cf. U.S. Pat. No. 5,763,075) could be used, so that the exposure device (at 26 in FIG. 10) would be redundant. However, in this case it would be necessary to ensure that the feed of blocking material is designed for a thermoplastic medium, which includes appropriate heating of the metering and feed devices for the blocking material and, optionally, cooling of the blocking station.

A device for blocking workpieces, particularly spectacle lenses, for processing and/or coating thereof is disclosed, comprising a support for supporting the workpiece to be blocked, a blocking station in which the workpiece can be blocked on a block piece by a temporarily deformable blocking material, and a transport device, which comprises a holding head for the workpiece and by which a relative movement between the workpiece held at the holding head on the one hand and the support as well as the blocking station on the other hand can be produced. In order to enable use of the blocking device which is as universal as possible, the transport device has at least four closed-loop position controlled movement axes (X, Y, Z, A, B, C), by which the workpiece with consideration of orientation and geometry data can be positioned in defined manner relative to a block piece disposed in the blocking station and, during the blocking, can be held in the defined relative position with respect to the block piece while leaving a blocking material receiving gap between workpiece and block piece.

Variations and modifications are possible without departing from the scope and spirit of the present invention as defined by the appended claims.

We claim:
1. A device for blocking workpieces, for processing and/or coating thereof, comprising:
   a support for supporting the workpiece to be blocked,
   a blocking station, in which the workpiece can be blocked on a block piece with a temporarily deformable blocking material,
   a transport device having a holding head for the workpiece that provides a relative movement between the workpiece held at the holding head on the one hand and the support as well as the blocking station on the other hand for transporting said workpiece between said blocking station and a loading unit,
   said transport device having at least four closed-loop drives configured to control movement of the workpiece held at said holding head in a defined manner relative to a block piece disposed in the blocking station with consideration of orientation and of geometry data of the workpiece, and to hold the workpiece stationary during the blocking in the defined relative position with respect to the block piece while leaving a blocking material receiving gap between workpiece and block piece,
   three of said at least four closed loop drives being configured to move said workpiece along a respective single axis that is mutually orthogonal to two other axes of motion to position said workpiece along the respective single axis such that said three of said at least four closed loop drives are constructed to move said holding head along a respective axis independent of the other's position and positioning, and
   one of said at least four closed loop drives being configured to rotate said holding head for said workpiece about one of said respective single axes.

2. A device according to claim 1, further characterized in that the transport device has in total six closed-loop drives for controlling movement along three linear axes that are substantially mutually perpendicular and three rotational axes, which are closed-loop controlled in rotational angle, about the respective linear axes,
   three respective closed loop drives that rotate said workpiece about a respective single axis that is mutually perpendicular to two other axes about which two other drives rotate said workpiece, such that the three closed loop drives rotating along a respective single axis is independent of each other's position and positioning, and
   said rotational axes about which said three respective closed loop drives rotate said workpiece being aligned with said linear axes which said three respective closed coop drives move said workpiece along.

3. A device according to claim 2, characterized in that the holding head for the workpiece is constructed to be rotatable and tiltable in three-dimensions with closed-loop control in rotational angle.

4. A device according to claim 3, characterized in that the holding head for the workpiece is movable, with closed-loop drive by a cross-table arrangement of the transport device along a single axis towards and away from a block piece, which is disposed in the blocking station, as well as transversely thereto.

5. A device according to claim 4, characterized in that the blocking station is arranged on a first slide of the transport device, said first slide is movable by one of said closed-loop drives transversely along a single axis with respect to the holding head for the workpiece.

6. A device according to claim 5, further characterized by:
a metering device by which a blocking material curable by light can be applied to a block piece disposed in the blocking station,
an exposure device which is spaced from the metering device and produces light for curing the blocking material, and
the blocking station being movable by the first slide of the transport device from the metering device to the exposure device and conversely.

7. A device according to claim 6, characterized in that the metering device comprises a metering head which is movable, preferably pivotable, in direction towards a block piece which is disposed in the blocking station, and away therefrom so that the blocking material can be fed in a position of the metering head near the block piece and the feed of the blocking material can be terminated under movement of the metering head from the position near the block piece to a position remote from the block piece.

8. A device according to claim 6, characterized in that the metering device comprises a metering head including a needle seat valve, which is connected by way of a throughflow meter with a feed device for the blocking material, which feed device in turn comprises a drum pumping unit for conveying the blocking material from an exchangeable receiving container.

9. A device according to claim 5, characterized in that the blocking station is movable by the first slide of the transport device driven by one closed loop drive into a transfer position in which a block piece is insertable into the blocking station or a workpiece blocked on a block piece is removable from the blocking station.

10. A device according to claim 9, characterized by said loading unit constructed to feed both the workpieces, and the block pieces to a working position, and remove the workpieces blocked on the block pieces from said working position.

11. A device according to claim 10, characterized in that the loading unit comprises a loading arm with a longitudinal axis, on which a loading head with at least one sucker is mounted to be rotatable through 180° about the longitudinal axis of the loading arm, wherein the loading arm is itself pivotable about a pivot axis, which extends perpendicularly to the longitudinal axis of the loading arm, and is linearly adjustable along the pivot axis.

12. A device according to claim 10, characterized by a block piece magazine for receiving a plurality of optionally different block pieces, from which a predetermined block piece can be automatically separated and transferred to the loading unit, whereupon the block piece is insertable by the loading unit into the blocking station, which is disposed in the transfer position, on the first slide of the transport device.

13. A device according to claim 5, characterized by a measuring station with an optical measuring device for positional recognition of the workpiece and a mechanical measuring device, which is spaced therefrom, for whole-area measurement of the workpiece surface to be blocked, wherein the workpiece to be blocked is transportable by the holding head of the transport device from the optical measuring device to the mechanical measuring device.

14. A device according to claim 13, characterized in that the transport device comprises a second slide which carries the support with a gripper for centering gripping of the workpiece, wherein the support together with the gripper is movable by the second slide driven by another of said closed loop drives from the optical measuring device to a transfer position, in which a workpiece can be placed on the support, and conversely back to the optical measuring device.

15. A device according to claim 14, characterized by a vertical unit for taking over a workpiece, which is to be blocked, from the loading unit and transferring the workpiece, which is to be blocked, to the support, which is disposed in the transfer position, with the gripper on the second slide of the transport device.

16. A device according to claim 5, characterized in that the holding head for the workpiece comprises a lens clamping unit with a sucker lip for sucking on the workpiece, the lip surrounding a pin relief which can be adapted to a contact surface of the workpiece and selectably clamped in order to support the workpiece at the contact surface thereof over as much as possible of the full area.

17. A device according to claim 1, characterized in that the holding head for the workpiece is constructed to be rotatable and tiltable in three-dimensions with closed-loop control in rotational angle.

18. A device according to claim 1, characterized in that the holding head for the workpiece is movable, with closed-loop control in position, by a cross-table arrangement of the transport device towards and away from a block piece, which is disposed in the blocking station, as well as transversely thereto.

19. A device according to claim 1, characterized in that the blocking station is arranged on a first slide of the transport device, said first slide is movable, with closed-loop control in position, transversely with respect to the holding head for the workpiece.

20. A device according to claim 19, further characterized by:
a metering device by which a blocking material curable by light can be applied to a block piece disposed in the blocking station,
an exposure device which is spaced from the metering device and produces light for curing the blocking material, and
the blocking station being movable by the first slide of the transport device from the metering device to the exposure device and conversely.

21. A device according to claim 1, characterized by a measuring station with an optical measuring device for positional recognition of the workpiece and a mechanical measuring device, which is spaced therefrom, for whole-area measurement of the workpiece surface to be blocked, wherein the workpiece to be blocked is transportable by the holding head of the transport device from the optical measuring device to the mechanical measuring device.

22. A device according to claim 21, characterized in that the transport device comprises a slide which carries the support with a gripper for centering gripping of the workpiece, wherein the support together with the gripper is movable by the slide from the optical measuring device to a transfer position, in which a workpiece can be placed on the support, and conversely back to the optical measuring device.

23. A device according to claim 1, characterized by said loading unit constructed to feed both the workpieces, and the block pieces to a working position, and remove the workpieces blocked on the block pieces from said working position.

24. A device according to claim 23, characterized in that the loading unit comprises a loading arm with a longitudinal axis, on which a loading head with at least one sucker is mounted to be rotatable through 180° about the longitudinal axis of the loading arm, wherein the loading arm is itself pivotable about a pivot axis, which extends perpendicularly to the longitudinal axis of the loading arm, and is linearly adjustable along the pivot axis.

25. A device according to claim 1, characterized in that the holding head for the workpiece comprises a lens clamping unit with a sucker lip for sucking on the workpiece, the lip surrounding a pin relief which can be adapted to a contact surface of the workpiece and selectably clamped in order to support the workpiece at the contact surface thereof over as much as possible of the full area.

* * * * *

UNITED STATES PATENT AND TRADEMARK OFFICE
CERTIFICATE OF CORRECTION

PATENT NO. : 8,616,150 B2
APPLICATION NO. : 12/991544
DATED : December 31, 2013
INVENTOR(S) : Marc Savoie et al.

Page 1 of 1

It is certified that error appears in the above-identified patent and that said Letters Patent is hereby corrected as shown below:

IN THE SPECIFICATION

Column 1, Line 41 - In the subtitle: Before "BACKGROUND" delete "PRIOR ART"
Column 7, Line 35 - After "use of a", delete "minor", insert --mirror--

Signed and Sealed this
Twenty-seventh Day of May, 2014

Michelle K. Lee
*Deputy Director of the United States Patent and Trademark Office*